US006922632B2

(12) United States Patent
Foxlin

(10) Patent No.: US 6,922,632 B2
(45) Date of Patent: Jul. 26, 2005

(54) TRACKING, AUTO-CALIBRATION, AND MAP-BUILDING SYSTEM

(75) Inventor: Eric Foxlin, Arlington, MA (US)

(73) Assignee: InterSense, Inc., Bedford, MA (US)

( * ) Notice: Subject to any disclaimer, the term of this patent is extended or adjusted under 35 U.S.C. 154(b) by 0 days.

(21) Appl. No.: 10/639,242

(22) Filed: Aug. 11, 2003

(65) Prior Publication Data

US 2004/0073360 A1 Apr. 15, 2004

Related U.S. Application Data

(60) Provisional application No. 60/402,178, filed on Aug. 9, 2002.

(51) Int. Cl.⁷ .............................................. G01C 21/26
(52) U.S. Cl. ....................... 701/207; 701/36; 701/220; 701/300; 342/357.07
(58) Field of Search ........................... 701/33, 36, 207, 701/220, 222, 225, 300; 342/357.01, 357.07, 357.08, 424

(56) References Cited

U.S. PATENT DOCUMENTS

| 6,176,837 B1 | | 1/2001 | Foxlin ......................... 600/595 |
| 6,288,785 B1 | * | 9/2001 | Frantz et al. ................ 356/614 |
| 6,611,141 B1 | * | 8/2003 | Schulz et al. ................ 324/226 |
| 2002/0052674 A1 | * | 5/2002 | Chang et al. ................ 700/300 |

FOREIGN PATENT DOCUMENTS

WO      WO 01/80736      11/2001

OTHER PUBLICATIONS

"IEEE Standard for a Smart Transducer Interface for Sensors and Actuators—Transducer to Microprocessor Communication Protocols and Transducer Electronic Data Sheet (TEDS) Format". Institute of Electrical and Electronics Engineers, Inc., New York, NY. Sep. 25, 1998.

Neal A. Carlson. "Federated Filter for Fault–Tolerant Integrated Navigation". NATO Advisory Group for Aerospace Research and Development (AGARD) book "Aerospace Navigation Systems", AGARD–AG–331, published Jun., 1995, pp. 265–280.

V. A. Tupysev. "A Generalized Approach to the Problem of Distributed Kalman Filtering". AIAA–98–4309, pp. 1097–1116, Aug., 1998.

Donald T. Knight. "Rapid Development of Tightly–Coupled GPS/INS Systems". IEEE, 1977.

Gudrun Klinker et al. "Distributed User Tracking Concepts for Augmented Reality Applications". IEEE, pp. 37–44, 2000.

* cited by examiner

Primary Examiner—Gertrude A. Jeanglaude
(74) Attorney, Agent, or Firm—Fish & Richardson P.C.

(57) ABSTRACT

A navigation or motion tracking system includes components associated with particular sensors, which are decoupled from a tracking component that takes advantage of information in the sensor measurements. The architecture of this system enables development of sensor-specific components independently of the tracking component, and enables sensors and their associated components to be added or removed without having to re-implement the tracking component. In a software implementation of the system, sensor-specific software components may be dynamically incorporated into the system and the tracking component is then automatically configured to take advantage of measurements from the corresponding sensors without having to modify the tracking component.

69 Claims, 12 Drawing Sheets

TRACKING, AUTO-CALIBRATION, AND MAP-BUILDING SYSTEM

CROSS-REFERENCE TO RELATED APPLICATIONS

This application claims the benefit of U.S. Provisional Application No. 60/402,178, filed Aug. 9, 2002, titled "Localization, Auto-Calibration, and Map-Building," the contents of which are incorporated herein by reference.

BACKGROUND

This invention relates to tracking, navigation, pose estimation, localization, auto-calibration, scene modeling, structure-from-motion and/or map-building based on sensor inputs.

Tracking or navigation systems often make use of measurements from sensors to aid in determining a location ("localization") or an orientation (attitude and heading) or a pose (position and orientation) of an object such as a person, a vehicle or a robot as it navigates in an environment, such as within the bounds of a building. A variety of types of sensors are available for such systems, including sensors that measure a relative location between a sensor and a target. An example of such a sensor/target combination is an acoustic emitter (target) and a microphone array (sensor) that can determine a direction of arrival of an acoustic signal broadcast from the emitter. Different types of sensors measure different aspects of the relative pose of a sensor and a target, such as a range, direction, or relative orientation. Different sensors may have different measurement characteristics that affect the mapping between the relative pose of a sensor and a target and the measurement values provided by the sensor. These characteristics can include uncertainty or noise characteristics of the measurement values.

Systems have been developed that use Kalman Filtering techniques to incorporate information in sensor measurements to track the position or orientation of an object, typically also using information about the dynamic characteristics of the object. The implementation of such Kalman Filtering techniques is often complex, and typically requires detailed knowledge of the measurement characteristics of the specific sensors used in tracking the object.

Some navigation systems perform simultaneous localization and mapping (SLAM), also known in the field of computer vision as structure-from-motion (SfM). The mapping aspect relates to determining the locations of fixed landmarks or beacons in the environment while at the same time using sensor measurements from those fixed landmarks to assist in localization of the object. As an example, when a robot navigates an uncharted territory, such as in a Mars rover mission, or in an underground mining or undersea operation, the robot may determine its location relative to the surrounding environment. If a complete map of the terrain is not available in advance, the robot may observe landmarks, build a map based on the landmark observations, and determine its location on the map that it has constructed so far. The landmarks may be man-made markers or natural features of the terrain.

As another example, an automated factory may use robots to move materials and products among different locations. Beacons, such as ultrasound emitters, or graphic markers having special patterns, may be placed at various locations in the factory. The robots may have sensors, such as ultrasound receivers, laser range finders, cameras, or pattern recognition devices, for determining their positions relative to reference points in the factory environment. The locations of the reference points may not be known in advance, so the robots may update their maps of the factory based on inputs from the sensors, and navigate through the factory based on their updated maps.

It may be desirable to also perform automatic calibration of sensors during the ongoing process of localization of the object. For example, various types of sensors may have different types of calibration parameters, such as measurement biases and scale factors. Examples of calibration parameters are focal lengths or distortion parameters of a camera lens, or alignment of a camera relative to the vehicle carrying it. The Kalman Filter implementation may estimate the sensor calibration parameters using a common infrastructure that is used to determine the location of the vehicle. As with the localization and mapping approaches, the characteristics of the calibration parameters are typically reflected in the implementation of the Kalman Filter techniques. Some systems combine localization, mapping, and auto-calibration.

SUMMARY

In a general aspect, the invention features a navigation or motion tracking system in which components associated with particular sensors are decoupled from a tracking component that takes advantage of information in the sensor measurements. The architecture of this system enables development of sensor-specific components independently of the tracking component, and enables sensors and their associated components to be added or removed without having to re-implement the tracking component. In a software implementation of the system, sensor-specific software components may be dynamically incorporated into the system and the tracking component is then automatically configured to take advantage of measurements from the corresponding sensors without having to modify the tracking component.

In general, in one aspect, the invention features a method for tracking an object that includes coupling a sensor subsystem to an estimation subsystem. The sensor subsystem enables measurement related to relative positions or orientations of sensing elements. Configuration data is accepted from the sensor subsystem, and the estimation system is configured according to the accepted configuration data. The method includes repeatedly updating a state estimate, including accepting measurement information from the sensor subsystem, and updating the state estimate according to the accepted configuration data and the accepted measurement data.

This and other aspects of the invention may include one or more of the following features.

Coupling the sensor subsystem to the estimation subsystem includes coupling software modules each associated with one or more of the sensing elements.

Each of the software modules provides a software interface for receiving information related to an expected sensor measurement and providing measurement information that depends on the received information.

Each of the software modules implements calculations that are independent of a representation of the state in the estimation subsystem.

The state estimate characterizes an estimate of a location of the object.

The state estimate characterizes configuration information for one or more sensing elements fixed to the object.

The configuration information for the one or more sensing elements fixed to the object includes information related to position or orientation of the sensing elements relative to the object.

The configuration information for the one or more sensing elements fixed to the object includes operational parameters for the one or more sensing elements.

The state estimate characterizes configuration information for one or more sensing elements fixed in an environment of the object.

The configuration information for one or more sensing elements fixed in the environment of the object includes a map of the locations of the sensing elements.

Repeatedly updating the state further includes providing to the sensor subsystems information related to an expected sensor measurement, and wherein accepting the measurement information from the sensor subsystem includes accepting information related to an actual sensor measurement.

Providing the information related to an expected sensor measurement includes providing information related to a relative geometric configuration of two of the sensing elements.

Providing information related to a relative geometric configuration of the two of the sensing elements includes providing information characterizing a relative location of the sensing elements.

Accepting the information related to an actual sensor measurement includes accepting information enabling the estimation subsystem to calculate a difference between the actual measurement and the expected measurement.

Accepting the information related to an actual sensor measurement includes accepting information for correlating measurements and geometric relationships between sensing elements.

The information for correlating measurements and geometric relationships between sensing elements includes a mapping between a relative pose of the sensing elements and a sensor measurement.

The mapping between the relative pose of the sensing elements and the sensor measurement characterizes a linear mapping.

Accepting the information related to an actual sensor measurement includes accepting information characterizing an uncertainty in the actual measurement.

The information characterizing the uncertainty in the actual measurement includes parameters of a statistical distribution of an error of the actual measurement.

Repeatedly updating the state further includes selecting a pair of sensing elements for measurement, and providing an identification of the selected pair to the sensing subsystem.

Selecting the pair of sensing elements includes selecting the elements according to an expected utility of a measurement associated with the elements to the updating of the state.

Repeatedly updating the state further includes updating the state according to the accepted information related to an actual sensor measurement.

Repeatedly updating the state further includes updating the state according to accepted measurements from inertial sensors.

Updating the state estimate includes applying a Kalman Filter approach.

Each of the sensing elements includes at least one of a sensor and a target.

The target includes an active device that interacts with the sensor.

The target includes at least one of a man-made signal reflector and a natural feature of an environment.

The object is selected from a group consisting of a vehicle, a robot, a person, a part of a person, a flying object, a floating object, an underwater moving object, an animal, a camera, a sensing apparatus, a helmet, a tool, a piece of sports equipment, a shoe, a boot, an article of clothing, a personal protective equipment, and a rigid object having a dimension between 1 nanometer to 109 meters.

The state estimate includes information related to a position or an orientation of the object relative to a reference coordinate frame.

In general, in another aspect, the invention features a tracking system includes an estimation subsystem, and a sensor subsystem coupled to the estimation subsystem. The sensor subsystem is configured to provide configuration data to the estimation subsystem and to provide measurement information to the estimation subsystem for localizing an object. The estimation subsystem is configured to update a location estimate for the object based on configuration data and measurement information accepted from the sensor subsystem.

This and other aspects of the invention may include one or more of the following features.

The sensor subsystem includes one or more sensor modules, each providing an interface for interacting with a corresponding set of one or more sensing elements.

The interface enables the sensor module to perform computations independently of an implementation of the estimation subsystem.

The interface enables the estimation subsystem to perform computations independently of an implementation of the sensor modules.

The tracking system also includes a navigation subsystem to navigate the object in an environment based on the location estimate for the object.

In general, in another aspect, the invention features a sensor module that includes a sensor interface for communicating with a measurement sensor, and a communication interface for communication with an estimation system. The sensor module is configured to receive information related to an expected sensor measurement over the communication interface, receive a measurement signal over the sensor interface, and provide measurement information based on the measurement signal over the communication interface.

This and other aspects of the invention may include one or more of the following features.

The sensor module is configured to provide information over the communication interface related to an uncertainty in the measurement information.

The received information related to an expected sensor measurement includes a predicted pose of a sensing element relative to the measurement sensor.

In general, in another aspect, the invention features a method that includes enumerating a set of sensing elements available to a tracking system that includes an estimation subsystem that estimates a position or orientation of an object, and providing parameters specific to the set of sensing elements to the tracking system to enable the estimation subsystem to be configured based on the parameters specific to the subset of sensing elements.

This and other aspects of the invention may include one or more of the following features.

The method includes generating a sequence of candidates of pairs of sensing elements selected from the set of sensing elements, the sequence based on an expected utility of a measurement associated with the elements to the estimation subsystem.

The method includes selecting a pair of sensing elements from the sequence of candidates, the selected pair of sensing elements being ready to make a measurement at the time of selection of the pair or at a predefined time after the time of selection of the pair, the selected pair having a highest expected utility of a measurement among the sequence of candidates.

The set of sensing elements includes at least one sensor and at least one target, the sensor making a measurement with respect to the target.

The target includes a natural feature in an environment.

In general, in another aspect, the invention features a method that includes computing an estimate of a pose of a target element relative to a sensor element based on an estimate of a pose of a tracked object relative to an environment having affixed thereto either the sensor element or the target element. The computing of the estimate of the pose of the target element relative to the sensor element is also based on an estimate of a pose of the affixed element relative to the tracked object and the other element relative to the environment. The method also includes computing an estimate of a measurement of the target made by the sensor based on the estimate of the pose of the target relative to the sensor, making an actual measurement of the target by using the sensor, computing a deviation between the actual measurement and the estimated measurement, and generating a new estimate of the pose of the tracked object based on the deviation.

This and other aspects of the invention may include one or more of the following features.

The method also includes computing a first observation matrix that characterizes a linearized model of a function relating the measurement made by the sensor to the pose of the target relative to the sensor.

The method also includes computing a second observation matrix that characterizes a linearized model of a function relating the pose of the target relative to the sensor to the estimate of the pose of the tracked object relative to the environment.

The also includes computing an observation matrix that characterizes a linearized model of a function relating the measurement made by the sensor to the pose of the tracked object relative to the environment by combining the first observation matrix and the second observation matrix.

In general, in another aspect, the invention features a method that includes estimating a first value associated with a pose of a first sensing element relative to a second sensing element. The first sensing element is fixed to an environment and the second sensing element is fixed to an object being tracked, One of the first and second sensing elements is a sensor and the other is a target. The method includes estimating a second value associated with a pose of the second sensing element relative to the first sensing element, determining which of the first and second sensing elements is the sensor, and generating an innovation of a measurement of the target made by the sensor based on the first value when the second sensing element is the sensor.

This and other aspects of the invention may include one or more of the following features.

The method also includes generating the innovation based on the second value when the first sensing element is the sensor.

Estimating the first value and estimating the second value are performed by a process ignorant of which of the first and second sensing elements is a sensor.

In general, in another aspect, the invention features a method that includes estimating a calibration parameter of a sensing element that is either a sensor or a target, the sensing element being fixed either to an environment or to an object being tracked. The method includes determining whether the sensing element is the sensor or the target, assigning the calibration parameter as a sensor calibration parameter when the sensing element is a sensor, and generating an innovation of a measurement of a target made by the sensing element based in part on the sensor calibration parameter.

This and other aspects of the invention may include one or more of the following features.

The method also includes assigning the calibration parameter as a target calibration parameter when the sensing element is a target, and generating an innovation of a measurement of the sensing element made by a sensor based in part on the target calibration parameter.

Estimating the calibration parameter is performed by a process ignorant of whether the sensing element is a sensor or a target.

In general, in another aspect, the invention features a method of using multiple sensors in a tracking system. The method includes providing an estimation subsystem, coupling one or more sensor modules to the estimation subsystem, each associated with a different set of one or more sensors. The method includes configuring the tracking system, which includes providing configuration information from each of the sensor modules to the estimation subsystem regarding the characteristics of the sensors associated with the sensor module, and configuring the estimation subsystem using the provided configuration information. The method includes maintaining estimates of tracking parameters in the estimation subsystem, including repeatedly passing data based on the estimates of the tracking parameters from the estimation subsystem to one or more of the sensor modules, receiving from the one or more sensor modules at the estimation subsystem data based on measurements obtained from the associated sensors, and the data passed to the sensor modules, and combining the data received from the one or more sensor modules and the estimates of the tracking parameters in the estimation subsystem to update the tracking parameters.

This and other aspects of the invention may include one or more of the following features.

The data passed from the estimation subsystem to one or more of the sensor modules includes an estimate of the pose of a target relative to a sensor that was calculated by the estimation subsystem using an estimate of the pose of a tracked object relative to a frame of reference fixed to an environment.

The data passed from the estimation subsystem to one or more of the sensor modules does not include the estimate of the pose of the tracked object relative to the frame of reference fixed to the environment.

Providing the estimation subsystem includes providing a module that is configurable to use different sets of sensor modules coupled to it.

Maintaining estimates of the tracking parameters in the estimation subsystem includes using a stochastic model in the estimation subsystem.

Using a stochastic model includes implementing some or all of a Kalman filter in the estimation subsystem.

Implementing some or all of the Kalman filter includes updating error estimates using linearized models of the sensor system.

Implementing some or all of the Kalman filter includes implementing a distributed Kalman filter, wherein each of a plurality of components of the distributed Kalman filter is associated with a different subset of the sensor modules.

One of the components of the distributed Kalman filter is associated with a subset of sensor modules consisting of sensor modules that are affixed to a tracked object.

One of the components of the distributed Kalman filter is associated with a subset of sensor modules consisting of sensor modules which are affixed to an environment.

One of the components of the distributed Kalman filter is not associated with any sensor modules.

Implementing the distributed Kalman filter includes implementing a Federated Kalman Filter.

Providing configuration information from the sensor modules includes providing information characterizing a type of a sensor associated with a sensor module.

Providing configuration information from the sensor modules includes providing information characterizing a position or an orientation of a sensor associated with a sensor module.

Providing configuration information from the sensor modules includes providing information characterizing one or more calibration parameters of a sensor associated with a sensor module.

In general, in another aspect, the invention features a machine-accessible medium, which when accessed results in a tracking or navigation system that tracks or navigates, respectively, an object, performing operations that includes enumerating a set of sensing elements available to the tracking or navigation system, where the sensing elements available to the tracking or navigation system includes at least one of an inside-out sensor and an outside-in sensor. The inside-out sensor is fixed to the object and makes measurements with respect to a target fixed to an environment. The outside-in sensor is fixed to the environment and makes measurements with respect to a target fixed to the object. The machine-accessible medium, when accessed, results in the tracking or navigation system configuring an estimation module of the tracking or navigation system based on an enumeration of the set of sensing elements available to the tracking or navigation system so that the estimation module can process measurement information from either inside-out sensors, outside-in sensors, or a combination of inside-out and outside-in sensors depending on the sensors available. The machine-accessible medium, when accessed, results in the tracking or navigation system repeatedly updating an estimated pose of an object based on measurements from the set of sensing elements available to the tracking or navigation system.

This and other aspects of the invention may include one or more of the following features.

The sensing elements available to the tracking or navigation system include range sensors, and configuring the estimation module includes configuring the estimation module so that the estimation module can process measurement information from either inside-out sensors, outside-in sensors, range sensors, or any combination of the above sensors.

The sensing elements available to the tracking or navigation system include inertial sensors, and configuring the estimation module includes configuring the estimation module so that the estimation module can process measurement information from either inside-out sensors, outside-in sensors, inertial sensors, or any combination of the above sensors.

The sensing elements available to the tracking or navigation system include dead reckoning sensors, and configuring the estimation module includes configuring the estimation module so that the estimation module can process measurement information from either inside-out sensors, outside-in sensors, dead reckoning sensors, or any combination of the above sensors.

In general, in another aspect, the invention features a tracking or navigation method that includes receiving sensor configuration information indicating a set of sensing elements available to a tracking or navigation system, and configuring a data processing module of the tracking or navigation system based on the sensor configuration information to selectively perform one of (a) receiving data from at least one inside-out bearing sensor, and updating an estimated pose of an object based on data received from the inside-out bearing sensor, (b) receiving data from at least one outside-in bearing sensor, and updating an estimated pose of an object based on data received from the outside-in bearing sensor, and (c) receiving data from at least one inside-out bearing sensor and at least one outside-in bearing sensor, and updating an estimated pose of an object based on data received from the outside-in bearing sensor and the inside-out bearing sensor.

This and other aspects of the invention may include one or more of the following features.

The tacking or navigation method also includes configuring the data processing module to selectively perform one of (d) receiving data from at least one range sensor, and updating an estimated pose of an object based on data received from the range sensor, (e) receiving data from at least one range sensor and at least one inside-out bearing sensor, and updating an estimated pose of an object based on data received from the range sensor and the inside-out bearing sensor, (f) receiving data from at least one range sensor and at least one outside-in bearing sensor, and updating an estimated pose of an object based on data received from the range sensor and the outside-in bearing sensor, and (g) receiving data from at least one range sensor, at least one outside-in bearing sensor, and at least one inside-out bearing sensor, and updating an estimated pose of an object based on data received from the range sensor, the inside-out bearing sensor, and the outside-in bearing sensor.

In general, in another aspect, the invention features an apparatus that includes an estimation module to estimate a pose of an object based on measurement data from sensing elements, the estimation module configured to enable selective performance of (a) receiving data from at least one inside-out bearing sensor, and updating an estimated pose of an object based on the data received from the inside-out bearing sensor, (b) receiving data from at least one outside-in bearing sensor, and updating an estimated pose of an object based on the data received from the outside-in bearing sensor, and (c) receiving data from at least one inside-out bearing sensor and at least one outside-in bearing sensor, and updating an estimated pose of an object based on the data received from the outside-in bearing sensor and the inside-out bearing sensor.

In general, in another aspect, the invention features an apparatus that includes an estimation module to estimate a pose of an object based on measurement data from sensing elements, the estimation module configured to enable selective performance of one of (a) updating an estimate of the position or orientation of the object relative to an environment, (b) updating an estimate of the position or orientation, relative to the object, of at least one sensing element fixed to the object, and (c) updating an estimate of the position or orientation, relative to the environment, of at least one sensing element fixed in the environment.

In general, in another aspect, the invention features a computer program that is capable of performing any combination (i.e., one, two, three, four, five, . . . , etc.) of a set of functions, and selects which function or functions to perform at runtime based on configuration information. In this aspect of the invention, the set of functions can feature any subset of the following: (i) receive data from one or more inside-out bearing sensors; (ii) receive data from one or more outside-in bearing sensors; (iii) receive data from one or more range sensors; (iv) receive data from one or more inertial or dead reckoning sensors; (v) receive data from one or more inside-out bearing sensors and one or more outside-in bearing sensors; (vi) receive data from one or more bearing sensors and one or more range sensors; (vii) update an estimate of the position or orientation of a tracked object relative to a reference coordinate frame; (viii) update estimates of the position or orientation relative to the tracked object of one or more sensors or targets affixed to the tracked object; (ix) update estimates of the position or orientation relative to the reference coordinate frame of one or more sensors or targets fixed in the reference coordinate frame; (x) update estimates of calibration parameters of one or more sensors; and (xi) update estimates of size or color or amplitude or frequency or pattern or category of one or more targets.

Implementations of the invention may include one or more of the following features.

The configuration information is obtained from configuration files stored on a computer readable medium accessible to the computer program.

The configuration information describing a particular sensor is obtained from a nonvolatile electronic memory device physically attached to said sensing device.

The computer program is capable of performing more than one of the functions in groups (i) to (vi).

The computer program is capable of performing more than one of the functions in groups (vii) to (xi).

The computer program is capable of simultaneously performing more than one of the functions in groups (i) to (vi).

The computer program is capable of simultaneously performing more than one of the functions in groups (vii) to (xi).

The computer program is capable of simultaneously performing one or more of the functions in groups (i) to (vi), and one or more of the functions in groups (vii) to (xi).

Aspects of the invention may include one or more of the following features.

The system is implemented in whole or in part in software.

The system provides an application programming interface to a software application that makes use of tracking or mapping data.

The application programming interface to the application does not necessarily expose the details of the sensor configuration.

Sensor modules are implemented in software.

The sensor modules each provides an application programming interface that is used by the system to communicate with the sensor modules.

The sensor module application programming interface does not depend on the specific characteristics of the set of sensors associated with that sensor module.

The sensor modules are implemented as dynamically loaded software modules.

The sensor modules are automatically detected by the system.

The sensor modules provide sensor parameters to a central estimation subsystem.

The sensor parameters include parameters that identify a basic type of a sensor, such as 2-D bearing, 1-D bearing, range, etc.

The sensor parameters include parameters that identify a specific type of a sensor, such as make and model, etc.

The sensor parameters are provided according to the IEEE 1451.2 Smart Transducer Interface standard.

The sensor module provides measurement related parameters for the sensors.

The measurement-related parameters include parameters of an observation model.

The parameters of an observation model include an observation matrix suitable for a Kalman Filter.

The estimation subsystem automatically configures a Kalman Filter using the provided sensor parameters.

The estimation subsystem repeatedly provides state-related information to the sensor modules.

The state-related information includes location information.

The location information includes location information related to a location of a target relative to a sensor.

The location information includes location information related to a fixed location in an environment.

The state-related information includes bias parameter information.

The sensor modules repeatedly accept the state-related information and combine that information with sensor measurement information, and pass the combined information to the estimation subsystem.

The combined information includes innovation data for the Kalman Filter.

The estimation subsystem implements an Extended Kalman Filter.

The estimation subsystem implements a distributed Kalman Filter.

The distributed Kalman Filter includes separate components associated with different sets of one or more sensing elements.

The distributed Kalman Filter includes a Federated Kalman Filter.

The estimation subsystem includes a sensor fusing module for combining information from different sets of sensors.

The estimation subsystem includes a localization filter.

The estimation subsystem includes a mapping filter.

The estimation subsystem includes a simultaneous localization and mapping filter.

The estimation subsystem includes an auto-calibration filter.

The estimation subsystem includes a simultaneous localization and auto-calibration filter.

The estimation subsystem includes a simultaneous localization, auto-calibration, and mapping filter.

The estimation subsystem includes a selector for selecting one of the localization, and auto-calibration, and mapping related filters.

The system independently switches between simultaneous tracking and auto-calibration, simultaneous tracking and mapping, tracking only, etc.

The estimation subsystem performs auto-calibration during an initial interval.

The estimation subsystem performs auto-calibration while in a pre-surveyed area for which map information is available.

The estimation subsystem stops performing auto-calibration after the initial interval, or after it leaves the pre-surveyed area.

Aspects of the invention enable a framework in which a user can rapidly implement a wide variety of user-configurable multi-sensor fusion systems for tracking, auto-calibration, auto-mapping, or any combination of the above. Advantages of one or more aspects of the invention may include one or more of the following:

Sensor versatility: The architecture allows use of various combinations of types and qualities of sensors—inside-out, outside-in, mixed, with or without inertial or dead-reckoning sensors.

Plug and track functionality: The architecture allows users to configure systems by plugging together self-identifying and self-describing smart sensor modules.

Scalability: The architecture enables deployment of systems with large numbers of tracked vehicles and/or large maps.

Flexibility: The architecture permits implementation of systems with one on-board processor per vehicle, or tracking systems in which a regional processor tracks all vehicles in the area.

Algorithm versatility: The architecture defines interfaces between modules to allow individual modules to be updated to take advantage of the newest large-scale simultaneous localization and mapping algorithms. The architecture allows the use of sub-map partitioning.

Function versatility: The navigation system may switch between simultaneous tracking and auto-calibration, simultaneous tracking and map-building, tracking only, or simultaneous tracking and map-building and auto-calibration.

Object-oriented design: The architecture facilitates reuse of the modules (e.g., PSE drivers or update filter modules) when the top-level navigation system design is changed.

Other features and advantages of the invention are apparent from the following description, and from the claims.

DESCRIPTION

1 System Overview

Figure 1:
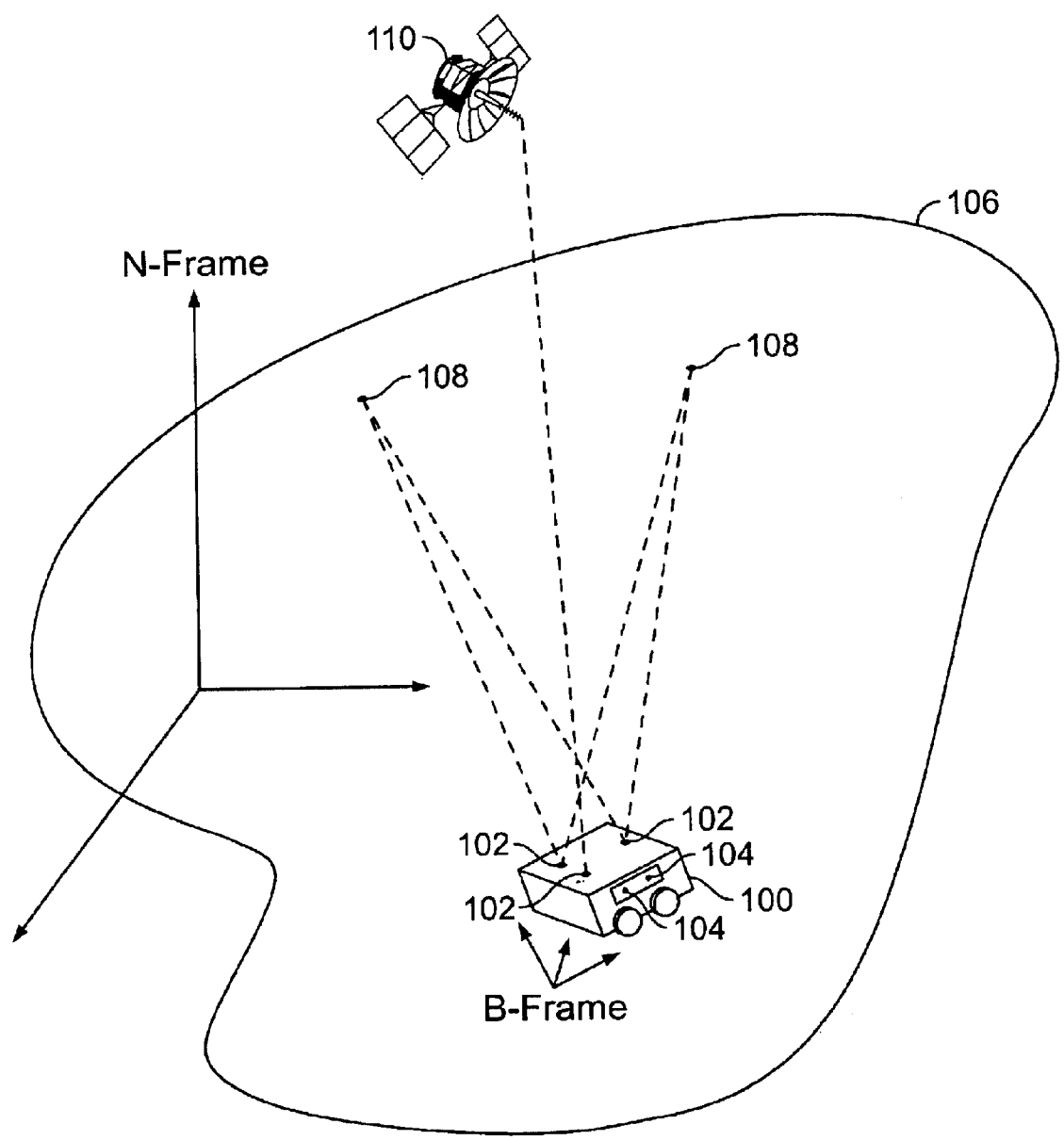
FIG. 1 shows a vehicle navigating an environment.
Figure 2:
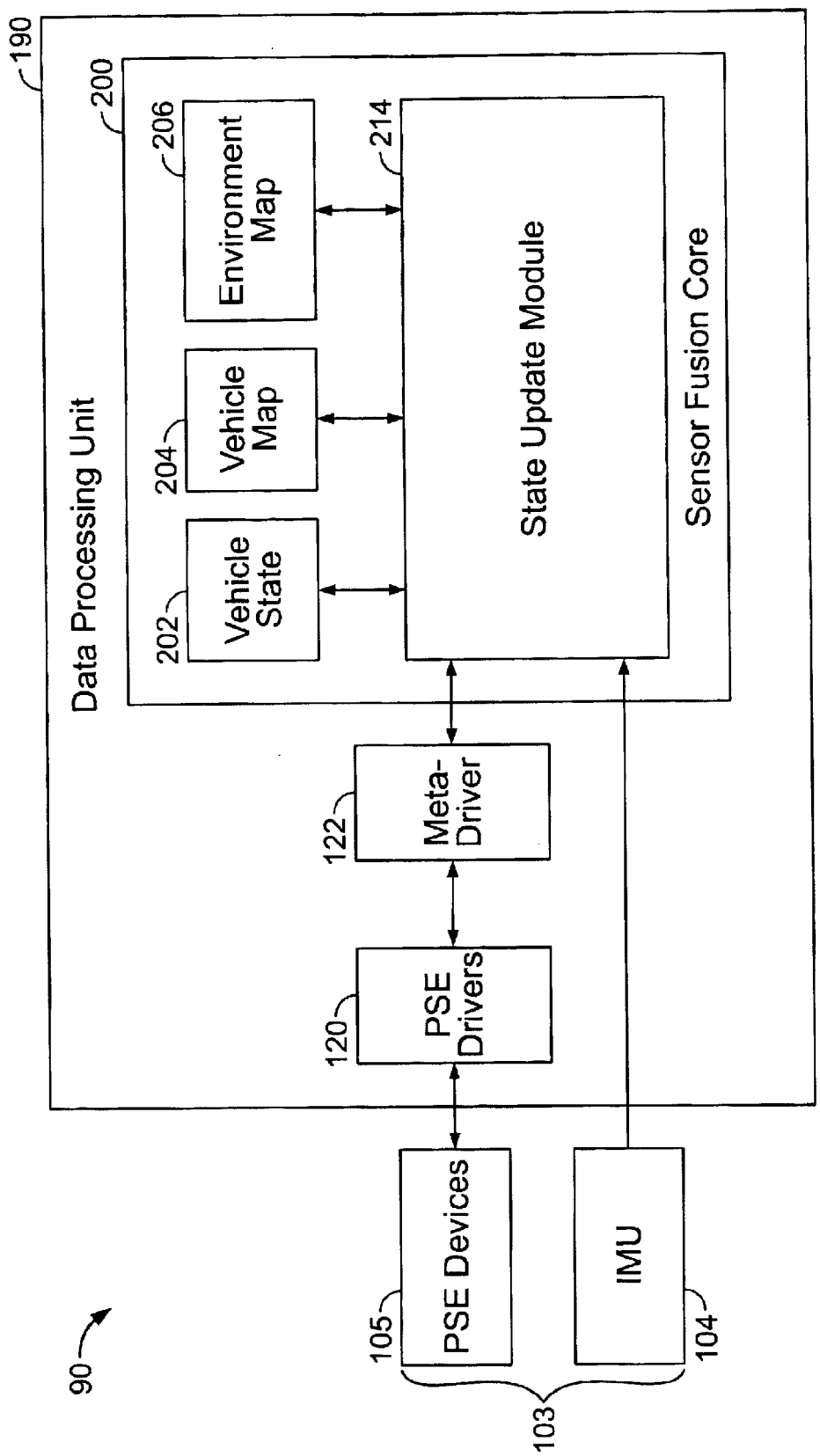
FIGS. 2 and 3 are block diagrams of a navigation system.

Referring to FIGS. 1 and 2, a navigation system 90 tracks or navigates a vehicle 100 in an environment (or "galaxy") 106, such as within a factory building. Navigation system 90 (see FIG. 2) includes sensors 103 that provide measurement data and a data processing unit 190 that processes data provided by the sensors. The navigation system 90 builds a map of the environment, calibrates the sensors, and determines the location of the vehicle in the galaxy frame of reference. The navigation system 90 tracks the position and the orientation (together referred to as the 6-dimensional "pose") of vehicle 100 based on both inertial measurements as well as sensor measurements between sensing devices or targets in the vehicle 100 and sensing devices or targets that are fixed in the environment 106.

The terms "environment" and "galaxy" is used interchangeably in the description below. The environment can be one, two, or three dimensional. For example, environment 106 may be a track that winds through a factory. Environment 106 may be a land mass, an ocean floor, a factory floor, a room, a building, a town, an airspace, an ocean body, or an underground tunnel. Environment 106 may be moving relative to earth. For example, the environment may be the interior of an aircraft carrier or a space surrounding a space shuttle orbiting the earth. Vehicle 100 may be, for example, a land vehicle, a water vehicle, an aircraft, a spacecraft, a robot, a person, a part of a person, a flying object, a floating object, an underwater moving object, an animal, a camera, a weapon, a handheld object, a sensing apparatus, a helmet, a tool, a medical instrument, a display, a piece of sports equipment, a shoe, a boot, an article of clothing, a personal protective equipment, or some other object. The terms vehicle and navigation are used for simplicity, but should not be construed to limit the scope of the invention, which is equally intended for tracking any object for any purpose. Therefore, the terms "navigation system" and "tracking system" will be used interchangeably in the description below, as will the terms "vehicle" and "tracked object".

The pose of the vehicle is estimated in a fixed frame of reference in environment 106, which is referred to as the galaxy frame of reference or the navigation frame of reference ("N-frame"). In one version of the system, the galaxy frame of reference is an inertial frame of reference. Inertial sensors 104, which are part of an inertial measurement unit (IMU), provide measurements for inertial tracking of the vehicle by an inertial navigation subsystem.

Navigation system 90 makes use of two general classes of sensor measurements. One class of sensor measurements, called interoceptive measurements, are used for dead reckoning. Interoceptive measurements are made within the vehicle, without reference to any elements external to the vehicle. This class includes inertial measurements (e.g., from linear or angular accelerometers or from gyroscopes) and relative displacement measurements (e.g., from wheel encoders or optical flow sensors). In the discussion below, one or more inertial measurement units (IMUs) provide the dead-reckoning measurements to the navigation system. However, the system architecture has been designed to support the substitution of other interoceptive sensors, so the abbreviation IMU may also be interpreted as "interoceptive measurement unit" where the context permits.

A second class of sensor measurements, called exteroceptive measurements, provide measurements between elements on the vehicle and elements external to it. Within this class, some measurements are relative to the reference frame ("earth referenced" measurements), such as GPS, altimeter, compass, and gravitometer measurements. Other sensor measurements are related to pairs of sensors and targets that are fixed to the vehicle and targets or sensors fixed in the environment ("map-referenced" measurements).

The sensors and targets fixed to the vehicle or fixed in the environment are collectively referred to as "pose sensing elements" (PSEs). The PSEs fixed to the vehicle 100 are referred to as "mobile" PSEs (MPSEs) 102 and the PSEs fixed in the environment 106 are referred to as "fixed" PSEs (FPSEs) 108. Sensor measurements generally relate to measurements between pairs of PSEs (indicated by the dashed lines), one MPSE and one FPSE, and depend on aspects of the relative (6-dimensional) pose of the two PSEs.

As introduced above, PSEs generally fall into two groups: sensors and targets. Examples of sensors include cameras and microphones. Examples of targets include target images (e.g., a bulls-eye) and acoustic beacons (sound emitters). It is not necessary that the sensor PSEs be fixed to the vehicle and targets fixed in the environment. For example, sensors may also be fixed in the environment such as tracking cameras fixed in a factory environment that track movements of vehicles moving on the factory floor.

Targets may be active or passive. An example of an active target is an ultrasound speaker that emits ultrasound signals. An example of a passive target is a circular marking pasted on the ceiling of a room, or a natural landmark such as a corner of a building, or rocks in a terrain.

For earth-referenced sensors (such as a GPS receiver), the sensor is an MPSE, with no specific target FPSE being associated with measurements by that sensor.

In various vehicle configurations, a wide variety of sensors and targets may be used. Navigation system 90 is modularized and configurable such that different sensors and targets can be selected for a particular vehicle without necessarily having to re-implement and re-test the implementation of the navigation system. The architecture provides a "plug and track" capability in which sensors and targets and their associated software drivers can be "plugged" into the navigation system 90, which then makes use of the sensors and targets in tracking the vehicle. For example, an acoustic sensor such as a directional microphone may be "plugged" into the navigation system, and range and directionality characteristics of the microphones are automatically used by the navigation system 90 in tracking the vehicle 100.

Navigation system 90 also has the capability of automatically determining values of PSEs' intrinsic calibration parameters as well as estimating the extrinsic calibration parameters (poses) of PSEs (and optionally the IMUs) in a parent frame of reference (B-frame for MPSEs and N-frame for FPSEs). Examples of sensor intrinsic calibration parameters are camera lens distortion parameters or additive biases or scale factor error parameters in a range measuring system. The term "auto-calibration" is generally used in the discussion below to include estimating the intrinsic and/or extrinsic parameters of mobile sensors or targets relative to the vehicle, while the term "mapping" is generally used in the discussion below to include estimating the intrinsic or extrinsic parameters of fixed sensors or targets relative to the environment. This is slightly different from common usage, in which estimating the calibration parameters of sensors, even those fixed in the environment, would usually be called calibration rather than mapping.

When an MPSE is installed on vehicle 100, the information on the pose of the MPSE relative to the vehicle is not necessarily provided to the system or may be manually entered to limited accuracy by a user. While in auto-calibration mode, as the navigation system processes sensor inputs using that MPSE, the pose of the MPSE is updated. Such updating can also compensate for changes in pose of an MPSE, for example, because of a shifting of the MPSE during use of the vehicle.

2 Pose Sensing Elements (PSEs)

The navigation system 90 supports a wide variety of types of sensors to be used in tracking and navigation applications, each sensor having a different performance, operating environment, range, size, cost, update rate, and penetration capability.

As introduced above, PSEs provide two types of measurements. One type of measurements can be described as "map-point-referenced discrete update observables." Such measurements are made with respect to point references in the environment, and contribute directly to the environment mapping process. For example, ultrasonic sensors, Lidar (Light Detection And Ranging), radar, and raw GPS "pseudorange" data can be used to measure ranges. Laser scanners, linear CCD (charge coupled device) sensors, and phased array sensors can be used to measure one-dimensional bearing angles. Imaging sensors, PSD (position sensitive device) sensors, quadcells, and pan/tilt servos can be used to measure two-dimensional bearing angles. Doppler radar and phase-coherent acoustic sensors can be used to detect range rates. TDOA (time difference of arrival) RF or acoustic sensors and radar can be used to measure range differences. Active source magnetic trackers and electric field trackers can be used to measure dipole field components.

A second type of measurements provided by PSEs can be described as "earth-referenced discrete update observables." Such measurements are made with respect to physical properties of the environment. For example, processed GPS signals and altimeters can be used to measure Cartesian positions or aspects thereof. Magnetic compasses and gyro-compasses can be used to measure headings. Magnetometers and gravitometers can be used to measure fields that vary by location in the environment.

In the description below, when performing a bearing angle measurement, the "sensor" is defined as the device at the fulcrum of the bearing angle, even if it is actually a source rather than a detector of a signal. Thus, in the case where a laser scanner (or other light projector) and a photodetector are used to measure a bearing angle, the "sensor" is the laser, and the "target" is the photodetector. For an "inside-out" measurement, the sensor is attached to the vehicle and the target is fixed in the environment. For an "outside-in" measurement, a sensor fixed in the environment observes a target fixed to the moving vehicle.

For map-point referenced PSEs, a measurement $z_{ij}$ between a particular MPSE j and FPSE i depends on the relative pose $\lambda_{ij}$ of the sensor and the target. In general, this relationship takes the form of a non-linear function $z_{ij}=h_{ij}(\lambda_{ij})$. In general, this function depends on the characteristics of the sensor and may depend on the characteristics and/or the identity of the target. The function $h_{ij}(\lambda_{ij})$ is referred to as the observation function of the sensor. The value $\lambda_{ij}$ is measured in the sensor's frame of reference. This sensor-target pose, $\lambda_{ij}$, depends on the poses of the MPSE relative to the vehicle, the FPSE relative to the galaxy, and the vehicle relative to the galaxy.

The pose $\lambda_{ij}$ can be expressed using a number of different representations of the 6-degrees of freedom in the pose. In the present version of the system, the Cartesian coordinates x, y and z of the target in the sensor's frame of reference represent translation, and a 3×3 rotation matrix which transforms vectors from the target's frame of reference to the sensor's frame of reference represents orientation. Another potentially useful representation of the pose $\lambda_{ij}$ between the $i^{th}$ FPSE and the $j^{th}$ MPSE is expressed as $\lambda_{ij}=(\theta_i,\phi_i,\theta_j,\phi_j,l_{ij},t_{ij})$. Here $\theta_i$ is the angle between the FPSE principal axis and a line connecting the FPSE and the MPSE, and $l_{ij}$ is the length of the line. The azimuthal angle $\phi_i$ of this line is measured around the $i^{th}$ FPSE's principal axis (forward or x-axis) using a right hand rule and the FPSE's y-axis as the starting mark. Angles $\theta_j,\phi_j$ are a symmetrically defined off-axis angle and azimuthal angle of the departing ray from the $j^{th}$ MPSE. The final term, $t_{ij}$, is the twist of the imaginary rigid pole connecting the centers of the two PSEs about a swivel joint in the pole center, where the twist of each pole half relative to its PSE is fixed by imagining that the pole flattens out like a canoe paddle at the end, and the intersection of this blade with the PSE's y-z plane lies along the y-axis. The advantage of this unusual pose representation is that it is symmetrical—to reverse the direction of reference and find the inverse pose, just switch indices i and j.

For earth-referenced sensors, such as GPS sensors, there is no specific FPSE involved in the measurement. In this case, the subscript i is ignored and the pose of the MPSE is relative to a fixed point in the galaxy frame of reference.

To provide a simple example of a sensor measurement, suppose a sensor measures a separation of the MPSE and FPSE according to the equation $z_{ij}=l_{ij}^{-3}$. In this case, the observation function takes the form $h_{ij}((\theta_i \ \phi_i \ \theta_j \ \phi_j \ l_{ij} \ t_{ij}))=l_{ij}^{-3}$. More complex observation functions arise when the sensor measurement depends on more than simply the absolute separation of the sensor and target. Also, note that in general, the observation $z_{ij}$ is a vector-valued quantity.

The system makes use of an observation model in which the measured observation is assumed to be corrupted by an additive observation noise as $z_{ij}=h_{ij}(\lambda_{ij})+v_{ij}$. When the observation is vector-valued, the components of the observation noise $v_{ij}$ may be correlated, and the covariance of this noise is a matrix $R_{ij}(\lambda_{ij})$ which, as is noted, may depend on the relative pose of the sensor and the target.

In operation, it is useful to linearize the observation model about an "operating point" (e.g., an estimated pose $\hat{\lambda}_{ij}$) in the form $z_{ij}=H_{ij}(\hat{\lambda}_{ij})\lambda_{ij}+v_{ij}$. (With a 6-dimensional representation of the pose, and an m-dimensional observation, the observation matrix has 6 columns and m rows.) It is also useful to compute the difference between the expected measurement based on the estimated pose, $\hat{z}_{ij}=h_{ij}(\hat{\lambda}_{ij})$, and the actual sensor measurement. This difference, $\delta z=z_{ij}-\hat{z}_{ij}$, is referred to as the "innovation" in the measurement.

As discussed more fully below, a sensor and its associated components are responsible for accepting an estimated pose $\hat{\lambda}_{ij}$, computing the matrices $H_{ij}(\hat{\lambda}_{ij})$ and $R_{ij}(\hat{\lambda}_{ij})$ that depend on this estimated pose, making an actual measurement $z_{ij}$, and computing the innovation $z_{ij}-h_{ij}(\hat{\lambda}_{ij})$. Note that these operations and computations may be very specific to the sensor, and the computations may involve considerations of complex non-linear characteristics of the sensors.

As introduced above, the navigation system may also estimate intrinsic calibration (bias) parameters for the PSEs. In such a case, the observation function is extended to include these arguments as $z_{ij}=h_{ij}(\lambda_{ij},k_i,k_j)$, where $k_i$ and $k_j$ are vectors of calibration parameters for the FPSE i and MPSE j respectively. The observation model is extended to include the calibration parameters:

$$z_{ij} = \begin{bmatrix} H_{\lambda_{ij}} & H_{k_j} & H_{k_j} \end{bmatrix} \begin{bmatrix} \lambda_{ij} \\ k_i \\ k_j \end{bmatrix} + v_{ij}.$$

3 Tracking System Architecture

Referring to FIG. 2, sensors 103 include PSE devices and active targets 105 and IMU 104. Measurements by PSEs are made between pairs of PSEs, one PSE functioning as a sensor and the other PSE functioning as a target. In one example, the PSE sensor is fixed on vehicle 100 and the PSE target is fixed in the environment 106. In another example, the PSE sensor is fixed in the environment 106 and the PSE target is fixed on vehicle 100. In another example, where multiple vehicles are used, the PSE sensor is fixed in one vehicle and the PSE target is fixed in another vehicle. Measurements by PSEs allow the navigation system 90 to determine the vehicle's position relative to the environment or relative to other vehicles.

The interoceptive sensors (inertial or other dead-reckoning sensors) in IMU 104 make measurements without reference to anything outside the vehicle. For instance, integration of inertial measurements allows navigation system 90 to determine the vehicle's position relative to the vehicle's position at a prior time. If the vehicle's position in the galaxy frame of reference is known at the prior time, then the inertial measurements allow the navigation system 90 to make an estimate of the current location of the vehicle 100 in the galaxy frame of reference. Thus, when measurements between pairs of PSEs are not possible, such as when vehicle 100 navigates through a portion of the environment where PSEs in the environment are all blocked by obstacles, navigation system 90 can still keep track of the location (including orientation, and possibly other state variables of the vehicle such as velocity or rotation rate) of the vehicle based on the inertial measurements.

In the data processing unit 190, sensor-specific modeling is separated from the generic sensor fusion algorithms used to update system states. Specifically, sensor specific computations are isolated in PSE drivers 120. A meta-driver 122 provides an interface between the PSE drivers 120 and a sensor fusion core 200, which does not need to include sensor-specific aspects.

The PSE drivers 120 provide interfaces to PSE devices 105. PSE drivers 120 are software modules, which may be written by manufacturers of PSE devices 105 independently of the specific implementation of the sensor fusion core, and are implemented as shared object library files, such as ".dll" (dynamic link library) files under Windows or ".so" files under Unix. As will be described in more detail below, PSE drivers 120 include information and interfaces that are specific to the PSE devices 105, and data and code needed for computation of the linearized observation matrices, observation noise covariance matrices, and expected sensor measurements and/or innovations as described above.

Data processing unit 190 includes a sensor fusion core (SFC) 200 that processes information from sensors 103. SFC 200 includes a state update module 214 that updates a vehicle state 202, a vehicle map 204, and an environment map 206. The vehicle state includes estimates of the location and/or orientation of vehicle 100, as well as other relevant state variables for the vehicle, which is denoted as a vector x. The vehicle map 204 includes a map (i.e., the poses) of MPSEs in the vehicle's frame of reference (B-frame), denoted as a vector M of the stacked pose vectors $m_j$ of the individual MPSEs. The environment map 206 includes a map containing poses of FPSEs in the galaxy frame of reference (N-frame), denoted as a vector F of the stacked poses $f_i$ of the individual FPSEs. The overall state is denoted as the stacked vector $X=(x^T,M^T,F^T)^T$.

In versions of the system that estimate calibration parameters $k_i$ for $PSE_i$, each individual FPSE "vector" $f_i$ is composed of a position, orientation, and intrinsic parameter (bias) fields:

$$f_i = \begin{bmatrix} f_i^\rho \\ f_i^\varphi \\ f_i^k \end{bmatrix} = \begin{bmatrix} f_i^\chi \\ f_i^k \end{bmatrix},$$

where $f_i^\chi$ stands for the combined pose states and $f_i^k$ stands for the bias state. Similar notation is used for $MPSE_j$.

The vehicle state 202, vehicle map 204, and environment map 206 are stored in a memory. The term "vehicle state", depending on context, will refer either to the state of the vehicle or a portion of the memory storing the vehicle state. Likewise, the term "vehicle map", depending on context, will refer either to a map of the MPSEs on the vehicle or a portion of the memory storing the vehicle map. The term "environment map", depending on context, will refer either to a map of the FPSEs in the environment or a portion of the memory storing the environment map.

Data processing unit 190 includes a meta-driver 122 that is used as a bridge between PSE drivers 120 and SFC 200. By dividing data processing unit 190 into portions specific to PSE devices 105 and a portion specific to updating the states of the navigation system 90, the navigation system can be easily reconfigured depending on the latest versions of device drivers and/or update algorithms. The meta-driver 122 allows PSE devices 105 and PSE drivers 120 to be designed without knowledge of the inner workings of the SFC 200, and SFC 200 can be designed without knowledge of the specific details of the PSE devices 105 and PSE drivers 120. The details of the meta-driver 122 will be described below.

Figure 3:
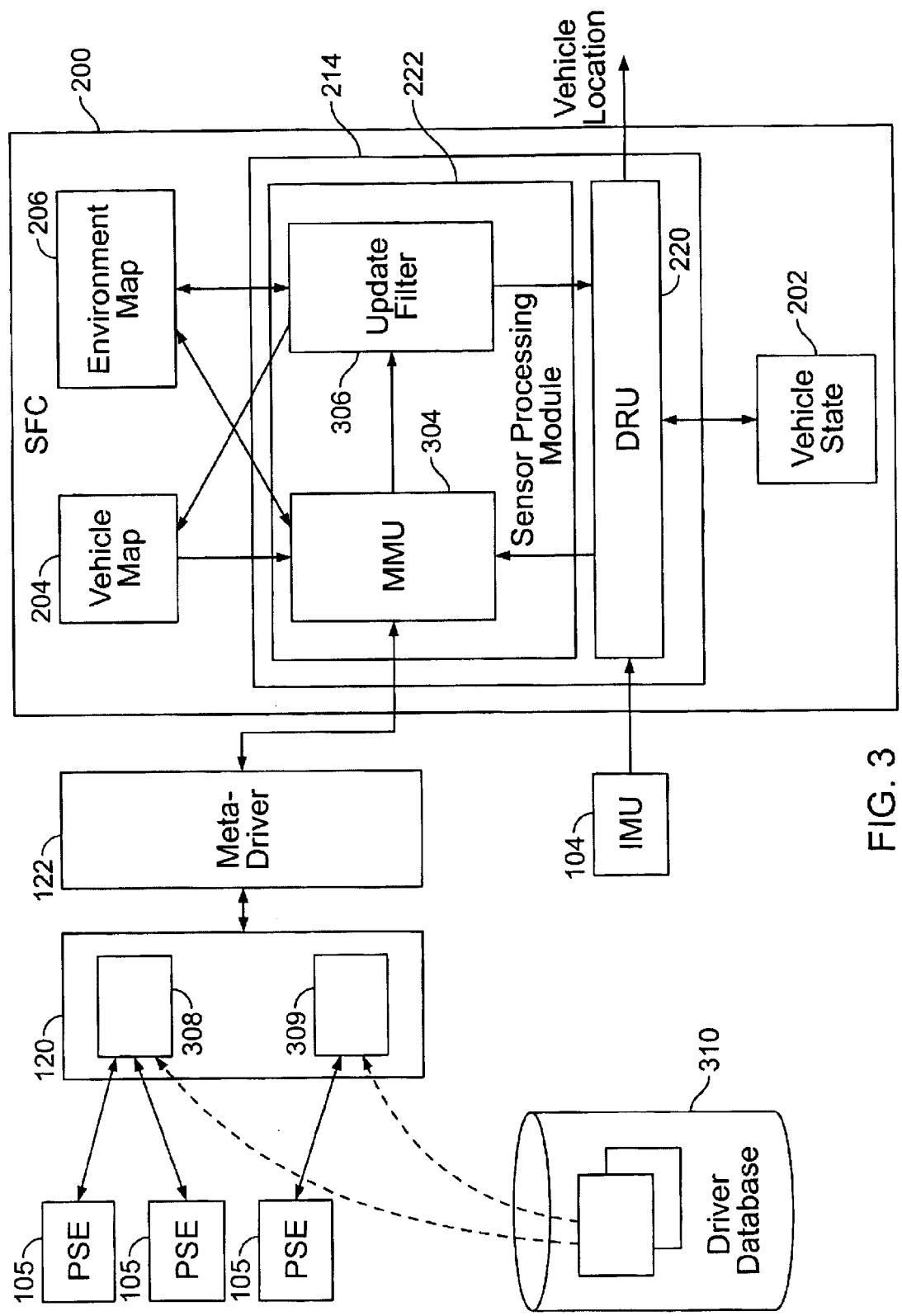

Referring to FIG. 3, the state update module 214 of the SFC 200 includes a dynamic reference unit (DRU) 220 for processing interoceptive measurement data and a sensor processing module 222 for incorporating exteroceptive measurement data. DRU 220 processes inertial and other deadreckoning measurements from IMU 104, while sensor processing module 222 processes measurements from PSE devices 105. The DRU 220 and sensor processing module 222 in combination updates the vehicle state 202, vehicle map 204, and environment map 206 using an iterative process. In operation, the DRU 220 may make use of multiple measurements from the IMU 104 between uses of measurements from the PSE devices 105. As described more fully below, SFC 200 periodically (e.g., once each time an exteroceptive measurement datum is available) uses a PSE sensor measurement to update the state of the system.

DRU 220 processes inertial measurements from IMU 104 and maintains the vehicle state 202. Sensor processing module 222 controls and processes PSE sensor measurements based on an estimate of the vehicle's state from the DRU 220, and determines adjustments to be made to the vehicle state 202, based on measurements from PSE sensors 105, which it passes in a feedback arrangement back to the DRU 220. The sensor processing module 222 maintains the vehicle map 204 and the environment map 206 which it uses in determining the amount of adjustment.

In navigation system 90, measurements from IMU 104 are made at constant intervals, e.g., 180 times per second. Measurements from PSE devices 105 are made whenever possible (i.e., when at least one measurement can be performed between a pair of PSEs). At each iteration, zero or one measurement requests between sensors and targets are sent to the meta-driver, and during the same iteration, zero or one PSE sensor measurements resulting from a previous request may be received from the meta-driver and used to update the state of the system. However, the limitation of one request and one result received per cycle is not intrinsic to the architecture, and may be increased to a larger number in a future implementation.

In addition to maintaining an estimate of the vehicle state, the DRU 220 calculates and provides the state transition matrix $\Phi_x$, and the process noise covariance matrix $Q_x$, to the sensor processing module which uses them to update an estimate of a covariance $P_{xx}$ of the estimation error of this vehicle state estimate. The term $P_{xx}$ will be referred to as the vehicle error covariance. The sensor processing module 222 uses the covariance and provides time updates to the covariance based on the matrices $\Phi_x$ and $Q_x$ on each iteration. It also provides measurement updates to the covariance on each iteration in which a measurement is received and processed.

The sensor processing module 222 includes a measurement management unit (MMU) 304 and an update filter 306. MMU 304 selects pairs of PSEs for measurements by taking into account the location of the vehicle, as well as a utility of different measurements that might be made. For instance, when the vehicle is at different locations, different pairs of PSEs may be in range of one another and of the pairs of PSEs that could be used, different pairs may be able to provide more useful information based on the characteristics of the sensors and/or the geometry of their relative locations. MMU 304 communicates with PSE driver 120 through meta-driver 122 to obtain the measurements from PSE devices 105 and corresponding sensor parameters, and provides processed sensor measurements and sensor parameters to the update filter 306.

When the navigation system 90 is powered up, MMU 304 or another component called sfShell, to be described later, calls the meta-driver 122 and requests that the meta-driver enumerate the sensing hardware. Meta-driver 122 loads available PSE drivers, such as 308 and 309, from a driver database 310. The PSE drivers are currently implemented as ".dll" files and assigned names having a format that allows the meta-driver 122 to detect them. The term "PSE drivers 120" refers to the PSE drivers collectively.

Meta-driver 122 then requests that each PSE driver 120 enumerate the PSE devices 105 that are available to navigation system 90 through that PSE driver and collect configuration information from those sensors. One PSE driver may control one or more than one PSE devices. Each PSE driver may control one or more types of PSE devices. For example, PSE driver 308 may control ultrasonic sensors and emitters, and PSE driver 309 may control laser range finders. Each PSE driver contains interfaces to, and possibly some information about parameters related to the PSE devices. The PSE devices may also store information about themselves. Meta-driver 122 receives the configuration information from PSE drivers 120, compiles the information and outputs a hardware configuration file "HW.cfg." The hardware configuration file lists all of the PSE devices available and their configuration information.

In one example, the PSE driver is written by the manufacturer of the PSE sensor associated with the PSE driver. A PSE driver may also control PSE devices made by different manufacturers.

By using meta-driver 122 to enumerate the PSEs available upon power-up of navigation system 90, the navigation system is able to automatically reconfigure itself and continue to perform accurate map building and navigation when PSE devices or IMUs are added or removed from the system. This capability is referred to as "plug-and-track".

During initialization, navigation system 90 reserves states in the state vectors processed by the update filter 306 to accommodate the states of the PSE devices that are found during the enumeration process. During active tracking, navigation system 90 can also add new states (e.g., when new PSE devices are found) or delete states (e.g., when PSE devices are determined to be unavailable).

By using the meta-driver 122, even though the existence of available PSE device 105 are relied upon in the calculation of inputs to update filter 306, the implementation of the sensor fusion core 200 is separated from the implementation of the devices 105, and thus it is possible to replace one type of sensor 105 with another without the need to redesign any components of the sensor fusion core 200. When the PSEs are added or removed from the system, the meta-driver 122 enumerates the PSEs connected to the system, and the SFC 200 accommodates them automatically, even if the new PSEs have structurally different measurement models or triggering policies compared to previous ones.

When navigation system 90 starts the process of tracking the location of vehicle 100, it first acquires an initial vehicle pose estimate in a process called acquisition, to be described later, and then enters tracking mode. In tracking mode, MMU 304 communicates with meta-driver 120 to determine which PSE pairs (including target and sensor) are available to make measurements during the next measurement cycle. MMU 304 selects a pair of PSEs from among the pairs of PSEs that are available to make measurements. MMU 304 makes the selection based on an "information gain" that represents the utility (or usefulness) of a measurement by the pair of PSEs to navigation system 90.

After MMU 304 selects the pair of PSEs that can make a measurement having the highest information gain, the MMU sends a message to meta-driver 122 to cause a PSE driver to trigger a measurement by the pair of PSEs. The actual measurement is generally available after a number of cycles due to the speed at which measurements can be made.

In choosing the pair of PSEs for making a measurement, MMU 304 first generates a "wishlist" of pairs of PSEs. The wishlist lists all of the pairs of PSEs consisting of a sensor which is available to the MMU and ready and a target which the MMU calculates to be within the sensing range of the sensor.

The MMU 304 sends the wishlist to an arbiter that is part of meta-driver 122. The arbiter identifies which pairs of PSEs on the wishlist are available to initiate a measurement in the next cycle. A particular pair may be marked by the arbiter as unavailable either because the pair of PSEs are still performing a measurement from a previous cycle or because the sensor or target is shared with one or more other vehicles. For shared devices, the arbiter tries to select a sensor-target pair which provides the highest information gain to as many of the requesting SFCs as possible. The arbiter sends a message to each requesting MMU, indicating that the MMU is allowed to request a measurement using that chosen pair in the next cycle. In the next cycle, the MMU sends a message to the meta-driver to cause a PSE driver corresponding to the selected pair of PSEs to trigger a measurement. The actual measurement may take many cycles to complete. Therefore, in each cycle, the MMU typically receives a measurement that it requested a number of cycles earlier. The sensor processing module 222 includes an update filter 306 to compute the amount of adjustment that needs to be made to the vehicle state 202, vehicle map 204, and environment map 206 after each measurement is made by a PSE sensor.

In the current version of the navigation system, the update filter 306 implements a complementary extended Kalman filter (CKF). The complementary extended Kalman filter estimates errors in the underlying states. The underlying states themselves are maintained outside of the CKF. Underlying states of the vehicle are maintained in the DRU. Underlying states used for intrinsic and extrinsic parameters of sensors and targets attached to the vehicle or to the galaxy are maintained in a vehicle map management module and galaxy map management module respectively. The CKF is decomposed into several separable modules by making use of a distributed Kalman filtering strategy called the Federated Kalman filter, which is modified to fit the complementary extended Kalman filter architecture.

The communication between sensor processing module 222 and meta-driver 122 is in the sensor's frame of reference. The sensor processing module 222 has available to it the current vehicle state (including pose), the vehicle map and environment map. The vehicle pose together with the vehicle map determine the poses of the MPSEs in the global frame of reference. Therefore, the sensor processing module has sufficient information to compute the relative pose of any pair of an MPSE and an FPSE.

The complementary extended Kalman filter computes incremental updates $\delta X$ of underlying system states $X=(x^T, M^T, F^T)^T$ based on the innovations in the sensor measurements. To perform the computation, update filter 306 uses knowledge of the observation matrices that are linearized at the "operating point" (i.e., estimated system state $\hat{X}$) and the observation noise covariance matrix $R$.

Navigation system 90 is designed so that linearization of the non-linear measurement model equations are performed by the PSE drivers 120, and sensor processing module 222 performs the linear computations associated with the CKF. In this way, sensor processing module 222 can be implemented without knowledge of the characteristics of the PSE devices 105. The PSE devices can be designed without knowledge of the specific details of the sensor processing module 222. PSE devices 105 and drivers 120 also do not have to know their positions and orientations relative to vehicle 100 or the galaxy 106.

Navigation system 90 is designed so that update filter 222 performs computations with coordinates expressed in the galaxy frame of reference, whereas PSE drivers 120 perform computations with coordinates expressed in the PSE sensor frame of reference. Update filter 306 operates in the galaxy frame of reference allowing navigation system 90 to determine the location of vehicle 100 in the galaxy frame of reference. In order to allow PSE devices 105 to be designed independently, each PSE sensor 105 operates in its own frame of reference. The MMU 304 provides the coordinate transformations that are necessary to allow measurements processed by PSE drivers 120 to be used by update filter 306, and to allow pose predictions made by update filter 306 to be used by PSE drivers 120. The following provides a more detailed description of the coordinate transformations.

Figure 4:
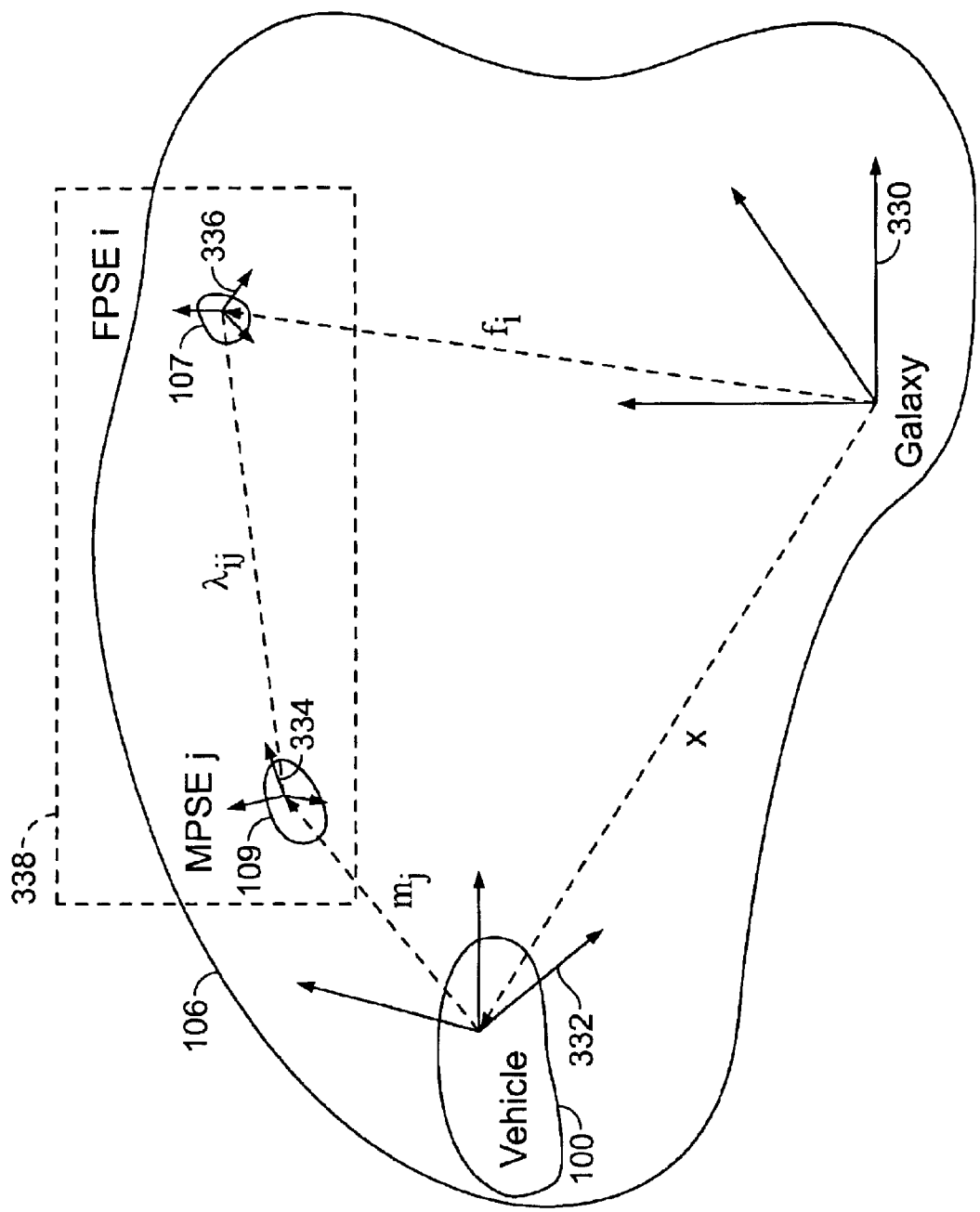
FIG. 4 shows different frames of reference.

FIG. 4 shows relative poses among galaxy 106, vehicle 100, and PSEs 338. The figure shows a measurement between a j-th MPSE ($MPSE_j$) 109 and an i-th FPSE ($FPSE_i$) 107. A galaxy frame of reference (N-frame) 330 is fixed relative to galaxy 106. A vehicle frame of reference (B-frame) 332 is fixed relative to vehicle 100. An MPSE frame of reference (j-frame) 334 is fixed relative to the MPSE$_j$ 109 and an FPSE frame of reference (i-frame) 336 is fixed relative to the FPSE$_i$. The pose of vehicle 100 relative to the N-frame 330 is denoted as x. The pose of FPSE$_i$ 107 relative to the N-frame 330 is denoted f$_i$. The pose of MPSE$_j$ 109 relative to the B-frame 332 is denoted m$_j$. The pose of MPSE$_j$ 109 relative to FPSE$_i$ 107 is denoted as $\lambda_{ij}$. The measurement made between MPSE$_j$ 109 and FPSE$_i$ 107 is denoted z$_{ij}$.

So far we have discussed a measurement between the j-th MPSE and the i-th FPSE without specifying which is the sensor and which is the target. In the case of an inside-out measurement, the MPSE is a sensor and the FPSE is a target. In this case, the sensor frame or s-frame is the j-frame, and the target frame or t-frame is the i-frame. In that case we denote the pose of the target relative to the sensor, by $\lambda_{st}=\lambda_{ji}$. This pose may be represented, for example, by a translation vector and rotation matrix $\{r_{j \to i}{}^j, C_i^j\}$ For an outside-in measurement, the s-frame is the i-frame and the t-frame is the j-frame, so $\lambda_{st}=\lambda_{ij}=\lambda_{ji}^{-1}$ where the inverse pose may be calculated by inverting the rotation matrix to get $C_j^i=(C_i^j)^T$ and reversing the translation vector and expressing it in the i-frame: $r_{i \to j}{}^i = C_j^i(-r_{j \to i}{}^j)$. For the symmetric 6-parameter representation of relative pose described earlier, reversing the pose referencing direction is achieved by switching the indices i and j.

PSE drivers 120 are designed to make measurements of targets relative to the S-frame of sensors, so that a PSE does not have to know whether it is attached to the vehicle or the galaxy, or know its pose relative to either one in order to make a measurement. This simplifies the design of PSEs and their drivers.

During tracking, MMU 304 computes a prediction $\hat{\lambda}_{ji}$ of the pose of FPSE$_i$ 107 relative to MPSE$_j$ frame of reference 334. This involves combining the estimates of $\hat{x}$, $\hat{m}_j$, and $\hat{f}_i$. The MMU then inverts this pose if necessary in order to obtain the sensor-target relative pose prediction $\hat{\lambda}_{st}$ as described in the previous paragraph. This is the sensor-target pose prediction sent by the MMU to the PSE driver 120. The PSE driver performs its computations in the sensor frame of reference 334, ignorant of actual values or estimates of x, m$_j$, or f$_i$. The PSE driver 120 estimates the predicted measurement $\hat{z}_{st}$ (which is a function h of the relative pose prediction $\hat{\lambda}_{st}$, the bias k$_s$ of the PSE sensor, and the bias k$_t$ of the PSE target), and produces a measurement error covariance matrix R which characterizes the expected degree of measurement noise in the planned measurement. PSE driver 120 sends to MMU 304 the predicted measurement $\hat{z}_{ij}$, $R_{ij}(\lambda_{ij})$, and the sensor-specific component of the observation matrix $$H_\lambda = \frac{\partial h(\lambda)}{\partial \lambda}$$

MMU 304 then uses the chain rule to convert the partial observation Jacobian H$_\lambda$ into the final observation matrices H$_x$, H$_m$, and H$_f$ needed by the Kalman filter in the update filter 306 to update x, m$_j$, and f$_i$, respectively. Because of the cross-correlation matrices P$_{MM}$ and P$_{FF}$ maintained in the update filter, this also allows the navigation system to update estimates for the poses of other sensors m$_{j'}$, j'≠j, and targets f$_{i'}$, i'≠i.

MMU 304 then obtains an actual measurement from the meta-driver 122, and passes the innovation, the R matrix, and the final H matrices to the update filter 306 for processing.

Some sensors function in a way that a prior knowledge of the relative position of the target can make the measurements more accurate. For example, when a camera is used as a sensor, having knowledge of an estimate of the target location allows the camera to be aimed at the target so that the target is near the center of the camera's field of view where there is less distortion, thus providing more accurate information on the location of the target. The estimated pose of the target relative to the camera sensor that is provided by the MMU 304 to the PSE driver 120 can be used for such adjustment of the field of view.

3.1 Meta-driver with Loadable Sensor Drivers

The meta-driver 122 provides uniform access for the SFC 200 to obtain information related to the PSEs. The meta-driver 122 is implemented as an application programming interface (API) that supports a number of function calls.

3.1.1 Discovery of Device Drivers and Devices

One function call (e.g., sfMetaEnumerate( )) invokes the enumeration process and returns a list of PSEs available to navigation system 90. The meta-driver 122 searches driver database 310 and loads PSE drivers (e.g., 308 and 309). Meta-driver 122 invokes each PSE driver to enumerate its PSEs. Each PSE driver is responsible for managing a particular type of PSEs (which can include different subtypes of PSEs, and can be made by different manufactures). The PSE drivers check the vehicle hardware to determine which PSE devices of its particular type(s) are connected to the vehicle. Each PSE driver reports back to the meta-driver 122, and the meta-driver 122 returns with a hardware configuration list that lists all of the PSEs available to the navigation system 90.

During enumeration, a handle which consists of a driver ID number and device ID number) is given to each PSE. For example, if there are 1000 PSEs on the ceiling of a room and 6 PSEs on the object being tracked, there would be 1006 handles. Meta-driver 122 would enumerate 1006 PSEs and furnish as much information about them as it was able to obtain from their respective PSE drivers 120.

3.1.2 Plug and Track Feature

A key feature of the navigation system 90 is the separation of modules specific to PSEs and modules specific to updating the states and maps. A separation between the PSEs and the update filters is desirable because there are different kinds of PSEs, each having different measurement characteristics. The measurement characteristics affect how the measurements are used in the update process. Due to the separation, PSEs can be designed without knowledge of the updating process. The modules specific for updating can be designed without knowledge of the PSE characteristics. A new PSE can be "plugged" into the navigation system and the navigation system will be able to recognize and use the new PSE.

3.2 Overall Operation

At any given time, the tracking system 90 (or navigation system) is in one of three primary modes of operation: initialization, acquisition, or tracking. When system 90 powers up, it starts in initialization mode, which includes the enumeration and self-configuration procedures described above. Once a valid system configuration has been achieved and stored in the requisite configuration files as described in the software architecture section later, the system moves into acquisition mode. In this mode, the goal is to find out the approximate location or pose of the vehicle in the galaxy. This initial pose estimate allows the system 90 to enter the tracking update loop, which involves a recursive estimation filter that uses an approximate initial guess of states.

When the acquisition procedures have found an initial estimate of the vehicle pose, the estimate x(0) is transferred into the DRU and the system enters tracking mode, in which it iteratively executes the tracking update loop. The system 90 remains in this tracking mode until some conditions occur, such as when the vehicle loses track of its location or pose information. This may happen when all of the exteroceptive measurements fail (for example, due to occlusion of line-of-sight sensors, or because the vehicle is out of range of all the FPSEs) for a prolonged period of time. If there is a prolonged period of time without external measurements, the vehicle pose estimate maintained in DRU 220 by dead-reckoning may drift to the extent that it becomes unusable. In that case, the system 90 returns to the acquisition mode.

The decision to re-acquire may be made automatically by the MMU 304 based on the pose estimation error covariance $P_{xx}$ or the recent history of measurement returns and acceptance/rejection of measurement data or both. Alternatively, a command may be sent by a user to the system 90 to force it to re-acquire. The system 90 can transmit the diagonal elements of $P_{xx}$ to a host application, along with its pose estimates $\hat{x}$. This allows the user to take into account the system's own degree of uncertainty about its current pose, along with other factors outside of the system 90, in deciding to force the system to re-acquire.

3.2.1 Initialization

Initialization includes the plug-and-track procedures that have already been discussed, by which the meta-driver identifies the IMUs and PSE devices that are present and stores configuration files that will be used by the SFC 200 to govern its operation, including acquisition and tracking. The details of how the configuration files are created, and how the system obtains user input to fill in missing information that could not be obtained by the meta-driver during enumeration, are discussed more fully below in the section on software architecture. Initialization occurs on power-up of the system 90. A command can also be sent to force the system 90 to re-initialize, such as in the event that PSE devices are added or removed while the system 90 is running.

3.2.2 Acquisition

During acquisition, a scheduler in the MMU 304 sends requests for measurements to the meta-driver 122, and but instead of instructing a sensor to make a measurement to a specific target, MMU 304 asks the sensor to scan its operating volume and report all targets that it can identify. In one example, the scheduler continues to send scan requests to each sensor in turn until enough measurements are returned to perform an acquisition. While this scanning sequence is in process, each returned measurement is saved to a memory stack inside of an acquisition module within the MMU 304. On each cycle, an algorithm within the acquisition module analyzes the set of measurements that have been returned recently, and determines whether the set of measurements is sufficient to solve for the vehicle pose.

For example, four 2D bearing measurements from inside-out bearing sensors (such as cameras) on the vehicle to known targets in the environment is sufficient to solve a 4-point pose-recovery algorithm (PRA) known in the computer vision literature as the perspective n-point problem. Alternatively, measurements from two outside-in cameras at known poses in the environment to a single target on the vehicle are sufficient to triangulate the position of that target. If the position of three targets on the vehicle can be measured (e.g., by using 3 measurements from each of two outside-in cameras), then the orientation of the vehicle can be deduced from the position of the three known MPSE targets. In a similar example, three range measurements from an acoustic emitter on the vehicle to three non-collinear acoustic receivers on the ceiling can be used to tri-laterate the position of the emitter MPSE. Also, combinations may be used, such as one outside-in camera measurement combined with one range measurement, or a combination of inside-out and outside-in measurements.

Depending on the set of measurements returned, the acquisition module invokes an appropriate PRA routine, such as triangulation, trilateration, solution of the perspective-n-point problem, or a combination algorithm. The PRA routine returns a failure condition (e.g., because the measurements given to the PRA routine were not sufficiently consistent to produce a high-confidence pose estimate), or returns a presumably valid initial vehicle pose estimate x(0).

If the PRA routine fails to determine the pose of the target, the MMU 304 remains in acquisition mode and continues to scan for more measurements. If the PRA routine succeeds, the MMU 304 sends the estimate x(0) to the DRU and switches the system into tracking mode. In order to initialize an complementary filter in update filter 306, the DRU 312 calculates an initial uncertainty for the vehicle state estimate, $P_{xx}(0)$, based on the confidence reported by the PRA routine, and sends $P_{xx}(0)$ to update filter 306. One example of causing the update filter 306 to initialize its $P_{xx}$ to $P_{xx}(0)$ is to send a $(\Phi_x, Q_x)$ message to the update filter with $\Phi_x$ set to a matrix of all zeros, and $Q_x$ set to $P_{xx}(0)$.

3.2.3 Tracking Update Loop

In the tracking mode, the navigation system 90 repeatedly makes measurements and updates an estimate of a location of vehicle 100 in an iterative process. Each iteration may have a duration of, e.g., $\frac{1}{180}$ second.

Within the primary system mode called tracking, the SFC can operate in a number of tracking modes. In a first mode of operation, navigation system 90 performs simultaneous localization and map-building (SLAM), and updates vehicle state 202 and environment map 206 in the iterative process. In a second mode of operation, navigation system 90 performs simultaneous localization and calibration (SLAC), and updates vehicle state 202 and vehicle map 204 in the iterative process. In a third mode of operation, navigation system 90 performs simultaneous localization, mapping, and calibration, and updates the vehicle state 202, vehicle map 204, and the environment map 206 in the iterative process. In a fourth mode of operation, navigation system 90 performs localization only (LO) by using existing vehicle map 204 and environment map 206, and does not update the maps; only estimates of the vehicle state 202 are updated.

The update filter 306, DRU 220, and MMU 304 form a feedback loop for updating the system states, as summarized in the following steps.

a) The DRU 220 updates and stores its estimate of the vehicle state (x) using inputs from IMU 104. DRU 220 generates $\Phi_x$ and $Q_x$, which represent the error propagation during a measurement cycle and sends them to update filter 306.

b) The update filter 306 updates $P_{xx}$ based on $\Phi_x$ and $Q_x$, and sends $P_{xx}$ to MMU 304.

c) MMU 304 interacts with meta-driver 122 and receives a measurement z from which it forms innovation $\delta z$, partial Jacobians H in the sensor frame of reference, and R. MMU 304 converts the partial Jacobians into observation matrices H in the galaxy frame of reference and sends them along with R and the innovation to update filter 306.

d) Update filter 306 generates an incremental update, $\delta X$, of the system state X based on $\delta z$, H's, and R. Update filter sends $\delta x$ to DRU 200.

e) The DRU 220 computes an updated estimate of the vehicle state x.

f) etc.

Figure 5:
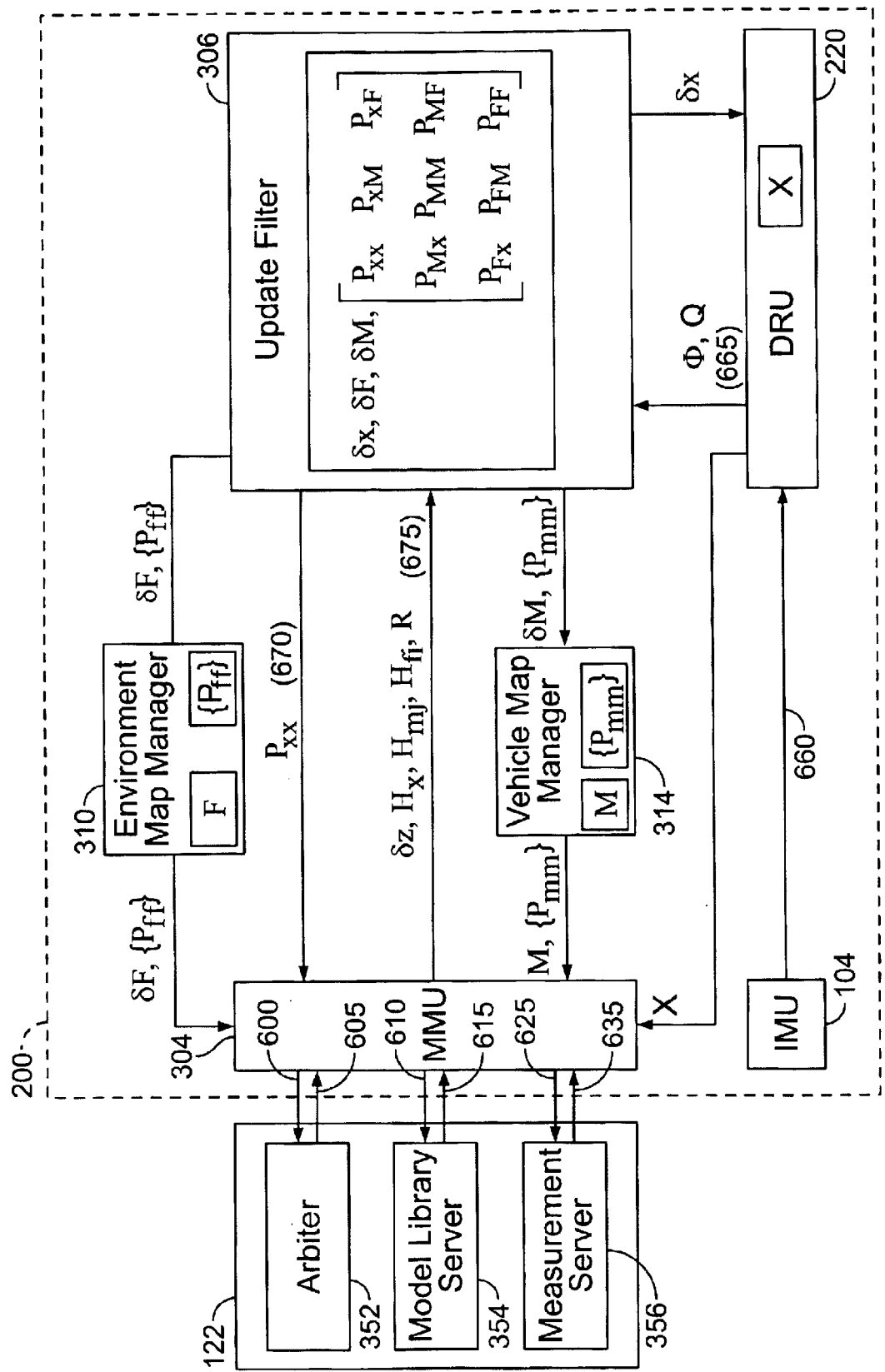
FIG. 5 shows an overall architecture of a navigation system.

FIG. 5 summarizes the sensor fusion core architecture described above. SFC 200 includes MMU 304, DRU 220, an environment map manager 310 that maintains environment map 206, a vehicle map manager 314 that manages the vehicle map 204, and update filter 306. The update filter 306 may be a centralized complementary Kalman filter that updates δx, δM, δF, $P_{xx}$, $P_{xM}$, $P_{xF}$, $P_{Mx}$, $P_{Fx}$, $P_{FF}$, and $P_{MM}$.

The underlying states of the navigation system 90 are maintained by the DRU 220 (which maintains the vehicle state x), the vehicle map manager 314 (which maintains the vehicle map, M), and the environment map manager 310 (which maintains the environment map, F). The update filter 306 estimates errors in the underlying MPSE poses and biases, and sends the corrections vector δM back to the vehicle map manager 314, which applies the corrections to the appropriate MPSE fields with appropriate translation of orientation format.

The update filter 306 sends error correction vector δF back to the environment map manager 310, which applies the corrections to the appropriate FPSE fields. Update filter 306 sends error correction vector δx to the DRU, which applies the corrections to update the vehicle state x.

The following describes an example of the data that is passed between the modules in a measurement cycle during active tracking.

At the start of the measurement cycle, the IMU 104 sends (660) a measurement to the DRU 220. DRU 220 may access IMU data through the meta-driver 122, or through a separate IMU meta-driver, or access directly. DRU 220 integrates the measurement and updates the vehicle state x. The DRU 220 also calculates a state transition matrix $\Phi_x$ and process noise matrix $Q_x$, which are sent (665) to the update filter 306. Based on $\Phi_x$ and $Q_x$, the update filter 306, updates the error covariance $P_{xx}$ using $P_{xx}(k+1) = \Phi_x(k) P_{xx}(k) \Phi_x(k)^T + Q_x(k)$, where k represents the time step. Update filter 306 sends (670) $P_{xx}$ to MMU 304, which uses $P_{xx}$ to calculate the innovation covariance matrix S.

As will be described in detail below, measurement matrices $H_x$, $H_{m_j}$, and $H_{f_i}$ are partitioned into generic and model-specific parts, keeping the generic operations inside the MMU 304 and pushing the sensor/target details out into the PSE drivers 120. As a result, the architecture is extensible by outside parties. A sensor manufacturer who understands its own product and can model its output, but knows nothing of Kalman filtering or SLAM theory, can follow some instructions and write a sensor driver that would enable the sensor to work with the sensor fusion core and be optimally fused with the inertial sensors and any other sensors that are attached.

The MMU 304 exchanges a sequence of messages with the meta-driver 122 (shown as 600, 605, 610, 615, 625, and 635, which will be described in more detail below in FIG. 6), and eventually receives a measurement z from the meta-driver 122. MMU 304 computes an innovation δz, which is the difference between the actual measurement z and the measurement that the PSE driver 120 would have predicted h($\hat{\lambda}$) based on the estimate of the relative pose $\hat{\lambda}$ of the PSE sensor and PSE target. The innovation may be the result of a measurement request that was made several cycles earlier, because a measurement may take several cycles to complete.

The MMU 304 also receives linearized measurement Jacobians $H_\lambda$, $H_{k_s}$, and $H_{k_t}$ (which are linearized about the operating points $\hat{\lambda}_{st}$, $\hat{k}_s$, and $\hat{k}_t$.) and the noise covariance R of the observation noise. MMU 304 converts $H_\lambda$, $H_{k_s}$, and $H_{k_t}$ (which are in the sensor frame of reference) into $H_x$, $H_{m_j}$, $H_{f_i}$, $H_{k_i}$, and $H_{k_j}$ (which are in the galaxy frame of reference).

MMU 304 sends (675) δz, $H_x$, $H_{m_j}$, $H_{f_i}$, $H_{k_i}$, $H_{k_j}$ and R to the update filter 306.

Based on δz, $H_x$, $H_{m_j}$, $H_{f_i}$, $H_{k_i}$, $H_{k_j}$ and R, the update filter 306 updates $\delta_x$, δM, δF, $P_{xx}$, $P_{xM}$, $P_{xF}^j$, $P_{Mx}$, $P_{MM}$, $P_{MF}$, $P_{Fx}$, $P_{FM}$, and $P_{FF}$. The update filter 306 sends δx to the DRU 220, sends δM and $\{P_{mm}\}$ to the vehicle map manager 314, and sends δF and $\{P_{ff}\}$ to the environment map manager 310. The notation $\{P_{ff}\}$ refers to the set of $\{P_{f1f1}, P_{f2f2}, \ldots\}$ each of which is an individual 3×3 (or 6×6 for full PSE pose auto-calibration/auto-mapping) pose uncertainty of one PSE. Based on δM, the vehicle map manager 314 updates M. Based on δF, the environment map manager updates F. Based on δx, the DRU 220 updates the vehicle state x.

The sequence in which the matrices or variables are updated is not critical. Each component of the SFC 200 uses the most current information it can get to update the variables that it maintains.

Figure 6:
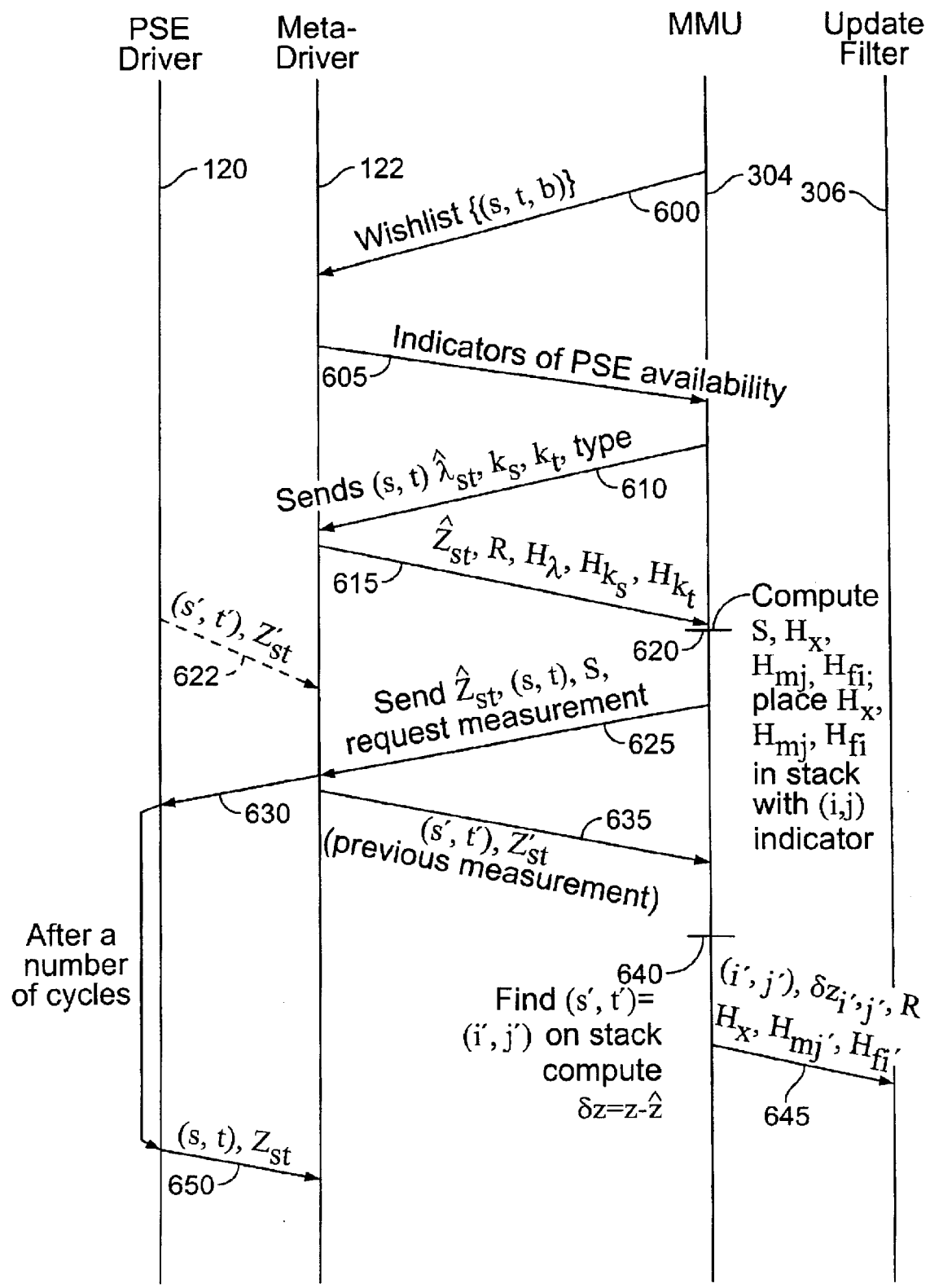
FIG. 6 is a block diagram of a measurement management unit.

FIG. 6 shows a sequence of messages that are passed among the update filter 306, MMU 304, meta-driver 122, and PSE driver 120.

Step 600: MMU 304 makes a wishlist of PSE pairs based on what PSEs are available and within range of each other. MMU 304 calculates the information gain B for each PSE pair based on an algorithm that determines the marginal benefit of the measurement to the vehicle. For example, a measurement having a lower measurement noise covariance may have a higher information gain than a measurement having a higher measurement noise covariance. In one instance, a measurement from a laser range finder may have a higher information gain than a measurement from an ultrasonic range finder, because using a laser is intrinsically more accurate than using ultrasound. In another instance, where the ultrasonic range finder is much closer to its target than the laser range finder to its corresponding target, the measurement from the ultrasonic range finder may have a higher information gain. In another instance, where navigation system 90 needs information about a range that is in the forward direction of vehicle 100, a PSE sensor having a lower accuracy and pointed in the forward direction may produce a measurement having a higher information gain than a measurement made by a more accurate sensor pointing in the sideways direction. Thus, the information gain may depend on both the type of the sensor and the circumstances of the measurement.

The optimal selection of which sensor-target pair to process on the current cycle is difficult to make independently without considering all possible sequences of measurements and comparing the results which would be achieved at the end of the sequence. This results in a complex scheduling problem. An example of a suboptimal but efficient algorithm is to optimize the marginal benefit of an individual selection assuming the past selections have already been made, and the current selection will be the last. The marginal benefit will be the decrease in some risk function associated with the tracking quality, for example the trace of the vehicle state estimation error covariance $P_{xx}$. This would require obtaining the measurement matrices $H_{ij}$ and $R_{ij}$ for each candidate sensor-target pair from the meta-driver and calculating the benefit of that measurement pair using:

$$B_{ij}(H_{ij}, R_{ij}) = \mathrm{trace}\left\{P_{xx} H_{ij}^T (H_{ij} P_{xx} H_{ij}^T + R_{ij})^{-1} H_{ij} P_{xx}\right\}.$$

Different choices of the risk function would lead to different expressions for marginal benefit. To reduce the amount of computation, some ad hoc or heuristic algorithm may be used for the benefit function, such as giving higher benefit to sensor-target pairs that differ more from recently used sensor-target pairs in terms of location, direction or measurement model. Additionally the benefit score of each sensor-target pair may be modified to take account of detection probability, for example by down-weighting targets which recently failed to be detected or returned unusable measurements and which may therefore still be occluded (or poorly lit, or inoperative). MMU 304 sends the wishlist, including sensor and target device handles and benefit score for each pair, to the arbiter 352 of the meta-driver 122.

Step 605: If there is only one vehicle, the meta-driver 122 ignores gain B, and returns indicators showing which PSEs are available.

If there are multiple vehicles, the arbiter 352 of the meta-driver 122 looks at the requests for shared hardware from all of the MMUs, and select a pair of PSEs that will result in the highest information gain for all of the vehicles. The meta-driver 122 returns an indicator showing which shared PSE pair is available. The meta-driver 122 also marks all the privately held PSE pairs available unless they are busy.

Step 610: Based on the indicators sent back from the arbiter 352, the MMU 304 selects an MPSE j and an FPSE i to make the measurement (e.g., by selecting the pair on the wishlist having the highest information gain among those the arbiter indicated are available). MMU 304 makes an estimate of the pose $\hat{\lambda}_{ij}$ based on estimates $(\hat{x}, \hat{m}_j^\chi, \hat{f}_i^\chi)$ of the poses of the vehicle, MPSE$_j$, and FPSE$_i$.

The notations $m_j^\chi$ and $f_i^\chi$ refer to the poses of the MPSE$_j$ and FPSE$_i$, respectively. The notations $m_j^k$ and $f_i^k$ refer to the biases (or calibration parameters) of the MPSE$_j$ and FPSE$_i$, respectively.

Before MMU 304 sends the estimate of the pose (and optionally, calibration vectors) to the library server 354, MMU 304 uses the (i,j) tags which identify the measurement pair in the SFC to look up the ("drvId," "devIdSensor," and "devIdTarget") tags which identify the pair in the meta-driver by determining which PSE driver (identified by the "drvId" tag) will be controlling the measurement, which PSE is the sensor (identified by the "devIdSensor" tag), and which PSE is the target (identified by the "devIdTarget" tag).

MMU 304 then performs a switch process to convert $\hat{\lambda}_{ij}$ (relating to the pose of MPSE$_j$ with respect to FPSE$_i$) into $\hat{\lambda}_{st}$ (relating to the pose of the target relative to the sensor). By using the MMU 304 to perform this switch process, the PSE driver 120 can be designed without knowledge of whether the measurement is inside-out or outside-in. The PSE driver 120 is designed to trigger a sensor to make a measurement of a target. The PSE driver 120 can be ignorant of whether the sensor is fixed to vehicle 100 and the target fixed to environment 106, or whether the sensor is fixed to environment 106 and the target fixed to vehicle 100. This allows greater flexibility in the design and deployment of the PSE devices (and their associated hardware drivers).

MMU performs the switch process as follows. If FPSE$_i$ is a sensor (such as in an outside-in measurement), then $\hat{\lambda}_{st}=\hat{\lambda}_{ij}$, $\hat{k}_s=\hat{f}_i^k$; $\hat{k}_t=\hat{m}_j^k$. It FPSE$_i$ is a target (such as in an inside-out measurement), then $\hat{\lambda}_{st}=\hat{\lambda}_{ji}$, $\hat{k}_s=\hat{m}_j^k$; $\hat{k}_t=\hat{f}_i^k$. MMU 304 also computes the partial Jacobian components of the pose $\lambda_{st}(x, m_j^\chi, f_i^\chi)$ with respect to x, $m_j^\chi$ and $f_i^\chi$ $$\left(i.e., \Lambda_x = \frac{\partial \lambda_{st}}{\partial x}\bigg|_{\hat{x},\hat{m}_j^\chi,\hat{f}_i^\chi}, \Lambda_{m_j^\chi} = \frac{\partial \lambda_{st}}{\partial m_j^\chi}\bigg|_{\hat{x},\hat{m}_j^\chi,\hat{f}_i^\chi},\right.$$

and $$\left.\Lambda_{f_i^\chi} = \frac{\partial \lambda_{st}}{\partial f_i^\chi}\bigg|_{\hat{x},\hat{m}_j^\chi,\hat{f}_i^\chi}\right),$$

which the MMU 304 saves in a stack in the memory to be used later (in step 620 below). MMU 304 sends $\hat{\lambda}_{st}$ and the (drvId, devIdSensor, devIdTarget) tags to the model library server 354 of the meta-driver 122. If auto-calibration or auto-mapping is performed, the MMU 304 also sends $\hat{k}_s$ and $\hat{k}_t$ to the meta-driver 122.

Step 615: Based on the drvId number, the model library server 354 of the meta-server 122 calls the model lookup function from the appropriate PSE driver 120 and passes in $\hat{\lambda}_{st}$. Based on $\hat{\lambda}_{st}$, the model lookup function of the PSE driver 120 computes $\hat{z}_{st}$, $H_\lambda$, $H_{k_s}$, and $H_{k_t}$ using:

$$\hat{z}_{st} = h(\hat{\lambda}_{st});$$

$$H_\lambda = \frac{\partial h(\lambda)}{\partial \lambda}\bigg|_{\hat{\lambda}};$$

$$H_{k_s} = \frac{\partial h(\lambda)}{\partial k_s}\bigg|_{\hat{k}_s}; \text{ and}$$

$$H_{k_t} = \frac{\partial h(\lambda)}{\partial k_t}\bigg|_{\hat{k}_t}.$$

The model lookup function of PSE driver 120 also computes the measurement noise matrix $R(\lambda_{st})$. These calculations involve the specific nonlinear observation model h and noise characteristics of the sensor device, and these calculations are handled in the specific PSE driver written to deal with that type of sensor device.

Model library server 354 receives $\hat{z}_{st}$, $H_\lambda$, $H_{k_s}$, $H_{k_t}$ and R from the PSE driver 120 and returns them to the MMU 304. The terms $H_\lambda$, $H_{k_s}$, $H_{k_t}$ each represents portions of the observation matrix in the sensor's frame of reference, and each includes information on how the measurement will depend on sensor-target pose, sensor biases, and target biases, respectively (linearized in the vicinity of the current estimates of those parameters).

Step 620: The values $H_\lambda$, $H_{k_s}$, $H_{k_t}$, $\hat{z}_{st}$, and R provided by model library server 354 are associated with the (drvId, devIdSensor, devIdTarget) tags. Also, the partial Jacobians $H_\lambda$, $H_{k_s}$, $H_{k_t}$ are in the sensor frame of reference. The MMU 304 converts $H_\lambda$, $H_{k_s}$, $H_{k_t}$ into the galaxy frame of reference by using the chain rule to combine the partial Jacobians from the model lookup with the saved Jacobians ($\Lambda_x$, $\Lambda_{m_j^\chi}$, and $\Lambda_{f_i^\chi}$), and using a second switch process:

$$H_x = H_{\lambda_{st}}\Lambda_x;$$

if FPSE$_i$ is a sensor (outside-in measurement), then $$H_m = [H_m \chi H_m{}^k] = [H_{\lambda_{st}}\Lambda_m \chi H_{k_t}],$$
$$H_f = [H_f \chi H_f{}^k] = [H_{\lambda_{st}}\Lambda_f \chi H_{k_s}];$$

if FPSE$_i$ is a target (inside-out measurement), then $$H_m = [H_m \chi H_m{}^k] = [H_{\lambda_{st}}\Lambda_m \chi H_{k_s}],$$
$$H_f = [H_f \chi H_f{}^k] = [H_{\lambda_{st}}\Lambda_f \chi H_{k_t}].$$

(The i, j subscripts were omitted in the above equations.)

The MMU 304 then computes innovation covariance matrix S using: $S = H_x P_{xx} H_x^T + H_m P_{mm} H_m^T + H_f P_{ff} H_f^T + R$. The innovation covariance represents the degree of uncertainty in how closely the actual measurement will match the prediction, due to a combination of measurement noise (with uncertainty R) and uncertainty in the prediction (resulting from uncertainties $P_{xx}$, $P_{mm}$ and $P_{ff}$ in the vehicle pose, MPSE pose and FPSE pose). It will be used in step 630 to calculate a search window or a range about the estimated measurement that the sensor should search for the target.

The MMU 304 places $H_x$, $H_{m_j}$, $H_{f_i}$, and R and S (which will be needed again for $\chi^2$ acceptance testing when the measurement result comes back, as described later) in the stack along with (i,j) tags to keep track of which PSE pairs are associated with the measurement matrices.

Step 622: A previous measurement $z'_{st}$ of (sensor s' and target t') is sent from a PSE driver 120 to the meta-driver 122, and queued by the meta-driver 122.

Step 625: The MMU 304 sends (drvId, devIdSensor, devIdTarget) tags, innovation covariance matrix S, and estimated measurement $\hat{z}_{st}$ to the meta-driver 122 and requests a measurement.

Step 630: The meta-driver 122 forwards the request for a measurement by the PSE pair identified by the (drvId, devIdSensor, devIdTarget) tags to the appropriate PSE driver 120 as designated by the drvId value. It also sends the predicted measurement $\hat{z}_{st}$ and the innovation covariance S. PSE driver 120 uses S to compute a measurement search region about $\hat{z}_{st}$, and then performs the measurement, returning only targets within this search region.

Step 635: The meta-driver 122 sends the measurement currently available, $z'_{s't'}$, along with its (drvId', devIdSensor', devIdTarget') tags to the MMU 304. The measurement z can sometimes represent a set of measurement results, because a sensor may find several targets within the search area (a.k.a. range gate), makes measurements with respect to every one of them, and returns all of the measurement results.

Step 640: The MMU 304 performs data association to select the most probable measurement result from the set, converts (s', t') to (i', j'), and matches the measurement $z'_{i'j'}$ with the $H_x'$, $H_{m_j}$, $H_{f_i}$, and R' and S' stored in the stack. The MMU 304 also computes the innovation $\delta z'_{i'j'} = z'_{i'j'} - \hat{z}'_{i'j'}$. And it applies a $\chi^2$ acceptance test to the innovation using the innovation covariance S' to make sure the measurement is not an outlier before feeding it to the update filter 306.

Step 645: The MMU sends (i', j') tags, innovation $\delta z'_{i'j'}$, measurement matrices $H_x'$, $H_{m_j}$, $H_{f_i}$, and noise covariance R' to the update filter 306. Optionally, MMU 304 sends a timestamp that represents when the measurement actually occurred. The update filter 306 can use the timestamp to effectively backtrack and apply the measurement in the update filter 306 at the right moment in the recent past.

Step 650: A number of cycles after the meta-driver requested a measurement from a PSE driver 120, the PSE driver 120 sends back the measurement $Z_{st}$, which is subsequently sent to the MMU 304.

3.2.4 Dynamic Reference Unit

At initialization of navigation system 90, DRU 220 or meta-driver 122 searches for interoceptive sensor drivers, and invokes the interoceptive sensor drivers to determine whether there are interoceptive sensors, such as inertial sensors, wheel encoders and dead-reckoning sensors.

Based on the type of interoceptive sensors available, DRU 220 determines whether tracking is desired in two-dimensional or three-dimensional space, and chooses an appropriate integration algorithm and error model. DRU 220 then asks each inertial sensor driver for a number of standard parameters appropriate to the integration model. Information about an IMU may include, for example, white noise and random walk amplitudes, root-mean-square initial uncertainty estimates for gyro and acceleration biases, ramps, misalignments, scale factors, nonlinearities, etc. Based on the sizes of these initial uncertainties, the DRU 220 decides whether to create estimable states in the state vector for each parameter. If DRU 220 does create states, it will cause the states to be estimated and corrected by update filter 306 simply by modeling their effects in the state transition matrix $\Phi_x$ and process noise matrix $Q_x$, and setting appropriate initial uncertainties for the states in $P_{xx}(0)$.

In one example, IMU 104 may use smart sensor modules that are compatible with an IEEE 1451.2 interface, which specifies a transducer electronic data sheet (TEDS) resident in an EEPROM of the sensor that identifies to the sensor driver the types of sensors present, and provides calibration data. In this situation, DRU 220 queries the sensor driver to obtain factory calibration data about the inertial sensor stored in the TEDS. Based on this data, DRU 220 compensates for sensor biases, scale factors, and misalignments.

When non-IEEE 1451.2 compliant inertial sensors are used, the sensor driver emulates the TEDS with user-supplied files.

4 Software Architecture and Multi-vehicle Tracking Support

The PSEs are represented by a class of PSE objects, which may be sensors or targets. Each PSE object has the following attributes:

(1) Pose (location and orientation) relative to the map of the environment or vehicle to which the PSE is attached.

(2) Pose uncertainty.

(3) Bias parameters vector k. This is used in the auto-calibration process.

(4) k-vector uncertainty.

(5) Basic type, which may be one of the following:

RS (range sensor)

RT (range sensor target)

2DBS (2-D bearing sensor)

2DBT (2-D bearing target)

1DBS (1-D bearing sensor)

1DBT (1-D bearing target)

RRS (range rate sensor)

RRT (range rate sensor target)

DS (dipole field component sensor).

DT (dipole target or source)

(6) Specific type, which includes the manufacturer name and model number.

(This is used by the scheduler to look up information about what other device types it can measure to, which ones it cannot be used simultaneously with, max update rate, response time, field of view (FOV) and range limitations, approximate resolution, etc.).

(7) Unique identifier (such as a HW device serial number, or barcode of a vision fiducial target)

(8) Color.

(9) Size. (Identifier, color, and size attributes may be used differently by different specific types of devices. For example, a fiducial may use the size field to represent the diameter of the target, while a smart camera may use it to represent the FOV, and an architectural corner feature may ignore it.)

(10) Driver number (of the PSE driver that enumerated it and controls or uses it).

(11) Device handle (assigned by the driver on enumeration and used to access this PSE through its PSE driver. This is relevant for actively controlled hardware devices.)

(12) Status (ready, busy, etc.).

(13) Membership (attached to galaxy [0] or to a particular vehicle [n])

In the present version of the system, SFC 200, meta-driver 122, and PSE drivers 120 shown in FIG. 2 are implemented as software dynamic link library (".dll") files.

When a particular PSE is used in a measurement, function calls are made to the ".dll" library corresponding to the appropriate PSE driver 120.

Figure 7:
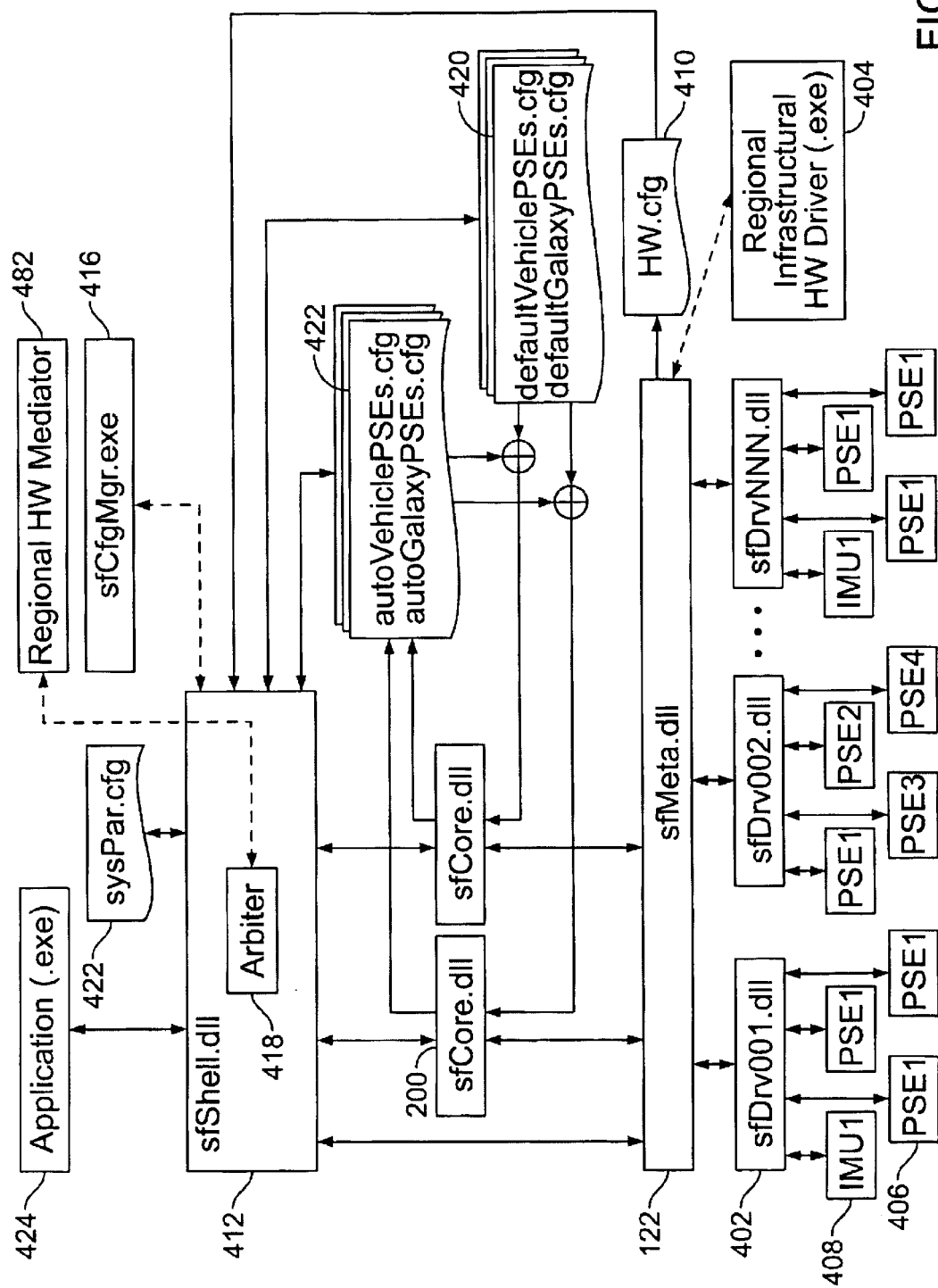
FIG. 7 is a block diagram of software modules of the navigation system.

FIG. 7 shows a block diagram of the software drivers of the tracking/navigation system 90.

Sensor Fusion Shell ("sfShell.dll")

Tracking system 90 includes a sensor fusion shell ("sfShell.dll") 412 that provides a unified access API for an application program 424 to obtain tracking data from one or more sensor fusion cores ("sfCore.dll") 200. As an example, application program 424 may use the outputs of navigation system 90 to control the movements of vehicle 100. In this example, the navigation system residing on the vehicle requires data about the pose of a single vehicle (itself) and needs to instantiate one sensor fusion core 200. In another example, a tracking system 90 may be used to track the poses of 15 limb segments on a human dancer for character animation. Since this application requires tracking poses of 15 separate "vehicles", all on the same computer and all reporting data to the same animation program, the sensor fusion shell would invoke 15 separate instances of the sensor fusion core .dll 200. The sensor fusion shell 412 also provides a unified access for a configuration manager ("sfCfgMgr.exe") 416 (described in more detail below) to control the configuration of the SFCs operating under a given shell.

In describing the software modules, the terms "sensor fusion core" and "sfCore.dll" will be used interchangeably. The same applies to other software modules.

At start-up, the application program 424 opens the sensor fusion shell 412. The sensor fusion shell 412 opens the meta-driver ("sfMeta.dll") 122, and causes it to enumerate all the sensor and target devices currently available. If necessary, the sensor fusion shell 412 invokes the configuration manager 416 to clarify the configuration of each SFC, such as which sensor/target data will be controlled by and available to which SFCs.

For hardware devices private to the SFCs, the sensor fusion shell 412 passes pointers to the sfMeta.dll functions (122) into each SFC to allow the SFCs to directly access the hardware drivers over which the SFCs have exclusive control. For shared hardware devices, the sensor fusion shell 412 passes pointers to shell functions that mediate between SFCs and invoke the sfMeta.dll functions in turn.

For a simple single-vehicle self-tracking configuration, an SFC 200 may be operated stand-alone without any shell. In this case, it invokes the meta-driver 122 directly instead of through the shell 412. The meta-driver 122 provides hardware arbitration functions to mimic those in the shell, so that downward interfaces of the SFC 200 are identical whether accessing the meta-driver 122 through shell functions or directly. This option is reserved to allow future embedded operation of the SFC 200 in mobile robots with limited memory resources or which may not be running an operating system which supports shared libraries like ".dlls".

Meta-driver

A meta-driver 122 provides a unified access API for accessing device drivers 120. Device drivers 120 include drivers that control PSEs or interoceptive measurement units. As illustrated, a single device driver (e.g., 402) may control both PSEs (e.g., 406) and IMUs (e.g., 408).

The meta-driver 122 communicates with two types of drivers. One type of drivers control local hardware devices that are used by vehicles (or equivalently SFCs) running on the same computer on which the local device drivers reside. This type of drivers are provided as dynamic link library (".dll") files 402. Each .dll file 402 may control a number of PSEs 406 or a number of IMUS 408 or a combination. Another type of drivers control hardware that is potentially shared by SFCs running on remote computers. This type of drivers are called regional hardware drivers 404, and are provided as separate executable files, which may be running on the local machine or on a remote machine. For regional drivers, the meta-driver 122 communicates with the drivers through a socket interface.

Local Drivers

Local drivers implemented as ".dll" files (402) provide the mechanism to allow third-party developers to extend the functionality of the tracking system by adding new devices (sensors or active targets) to be fused with the IMU 104 and/or with other devices already supported. To support a new device, the developer writes a ".dll" file conforming to the application programming interface (API) described later in this document, names it with a name in the format "sfDrvNNN*.dll", and places the driver in the appropriate directory.

In this naming convention, "NNN" represents a three-digit integer from 001 to 999, and is a number not already in use. The author is responsible for checking the directory for existing .dll files and picking a driver number not already taken. If the first 8 characters of a name are not "sfDrvNNN," then the file is ignored and not used as a driver, even if it is a valid .dll file. Extra characters after the first 8 are ignored and may be used by the developer to add a descriptive title to the driver, for example "sfDrv002_isenseSerialSmartCameras.dll."

Each driver may access one or more devices (i.e. sensor or active target PSEs or IMUs). At startup, each driver is asked to enumerate all of the devices that the driver controls, and give each device a unique integer handle that will be persistent from boot-up to boot-up. Then, for each listed device, the meta-driver requests a hardware description record which specifies as many of the PSE attributes as it can. The PSE driver may try to obtain this information from a transducer electronic data sheet (TEDS) or non-volatile memory that is physically located in the hardware device, or from a driver-specific configuration file or using any other mechanism. It may be difficult to obtain some of the attributes values. For example, pose relative to the vehicle or the galaxy may only be available for factory assembled fixed device clusters.

The meta-driver 122 compiles all the lists of information about each device from each driver into one master list and outputs it to a hardware configuration file "HW.cfg" 410.

The drivers provide a hardware abstraction layer so that the SFC 200 does not need to know how the devices are interfaced to the computer, or where the signal processing is performed. For example, one driver may communicate with a network of IEEE 1451.2 smart sensor modules over CAN bus or Ethernet. Each of these modules contains its own processor with nonvolatile memory that contains all the self-descriptive information listed above. The driver implements the code to use the calibration data contained in the transducer electronic data sheet (TEDS) to perform sensor compensation. Another driver may access a few smart cameras through the serial ports. This driver is responsible for checking on the available serial ports to see which if any has a smart camera attached. The image processing and sensor compensation may be performed in firmware on the smart cameras.

As another example, consider a driver that controls a network of acoustic emitter beacons through proprietary ISA bus hardware. As yet another example, there may be a driver that accesses a number of ordinary video cameras (e.g., cameras that do not process the images) over a firewire or USB bus. This driver then includes all the image processing and lens compensation code in its ".dll" file. For these drivers, the meta-driver does not need to know which port the hardware is physically attached to, or whether the information describing the device originated from the device or from a configuration file read by the driver. This is abstracted by the drivers and an integer device handle is returned, so that each device after initialization can be accessed using just a driver number and device number.

Sensor Fusion Core ("sfCore.dll")

Each SFC 200 makes function calls to the standard function pointers passed in by the "sfShell.dll" 412 that will be used by "sfShell.dll" 412 and/or "sfMeta.dll" file 122 to initialize the hardware, lookup model information, initiate measurements, retrieve measurement data, and perform arbitration. During its measurement scheduling process, each SFC 200 is required to provide "sfShell.dll" file 412 with a "wish list" of PSEs for its next scheduling cycle. That list is used by the hardware mediator 418 to determine which of the PSEs may actually be scheduled for update.

Meta Driver ("sfMeta.dll")

Meta driver 122 is the access point to all the hardware devices, local and regional. The SFC 200 receives function pointers from "sfShell.dll" 412 to enable the SFC 200 to obtain data from hardware devices. Hardware devices are marked exclusive or shared between SFCs. A regional hardware is considered shared. If a hardware device is exclusive, then SFC 200 will be able to obtain the data directly from the meta driver 122 using the function pointer. If a hardware device is shared, then is it the responsibility of "sfShell.dll" 412 to obtain the data from meta driver 122. Calls made from SFCs 200 simply retrieve the data from "sfShell.dll" 412.

Figure 8:
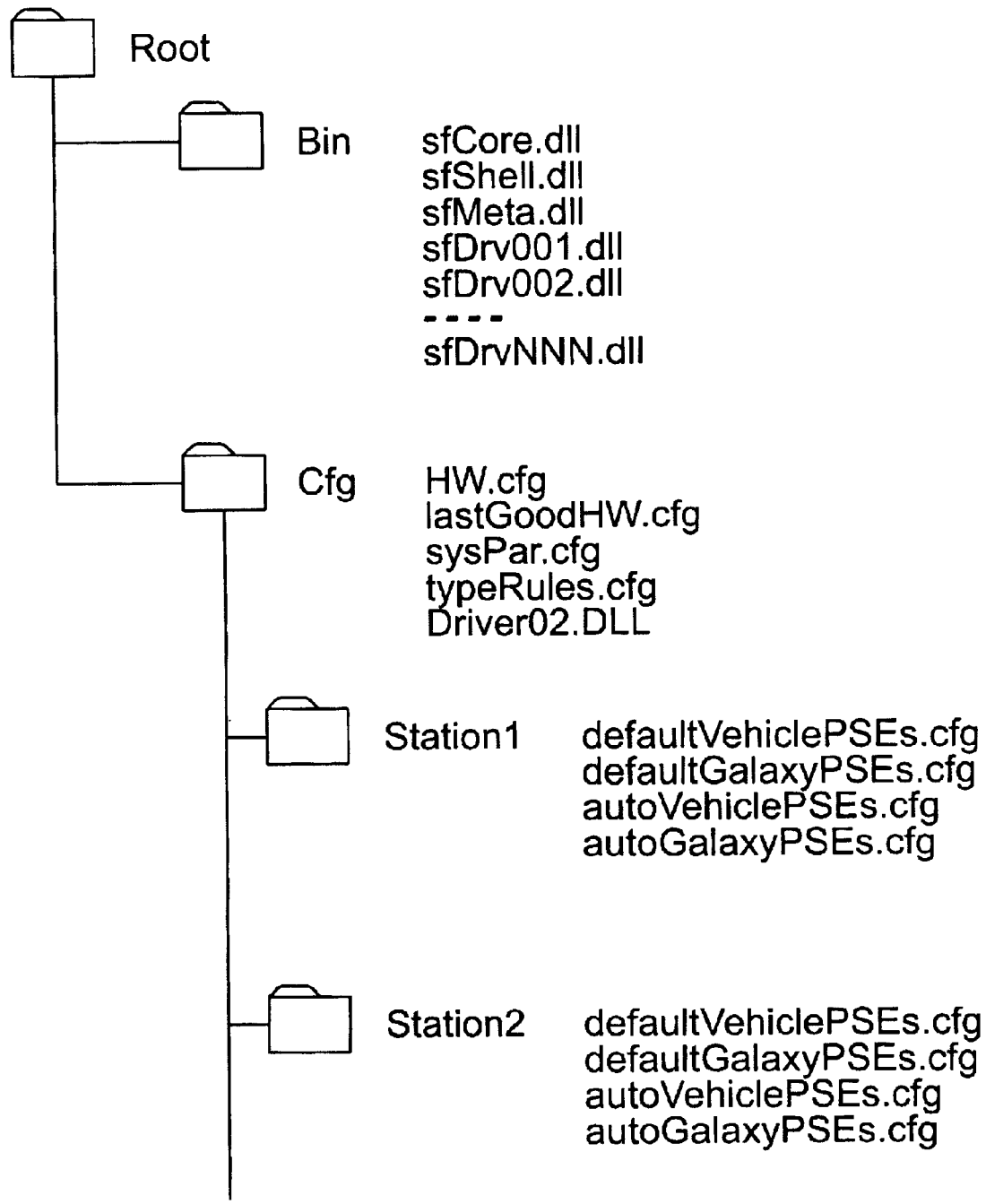
FIG. 8 shows a file directory structure used by the navigation system.

FIG. 8 shows an example of a directory structure of the driver files and configuration files that will be described below.

Configuration Files

The sensor fusion core 200 uses seven files to control its operation:

1) Hardware configuration file ("HW.cfg").
2) Default vehicle PSE configuration file ("defaultVehiclePSEs.cfg").
3) Default galaxy PSE configuration file ("defaultGalaxyPSEs.cfg").
4) Auto-calibrated vehicle configuration file ("autoVehiclePSEs.cfg").
5) Auto-mapped galaxy configuration file ("autoGalaxyPSEs.cfg").
6) System parameter configuration file ("sysPar.cfg").
7) Device type rule configuration file ("typeRules.cfg").

HW.cfg

The hardware configuration file ("HW.cfg") 410 is a flat file that is output by the meta-driver 122 when it completes initialization. "HW.cfg" 410 contains a compilation list with one line for each device found. The line contains the driver number and device number (to be used thereafter by the meta-driver 122 to access the device) and other descriptive information about the device arranged in the following order:

| Col 1 | Col 2 | Col 3 | Col 4–6 | Col 7–9 | Col 10–18 | Col 19–21 | Col 22–31 |
|---|---|---|---|---|---|---|---|
| Driver # | Device # | Status/ membership | X, y, z translation | X, y, z uncertainty | Rotation matrix | Rotation uncertainty | K parameters |
| | | | 32–41 | Col 42 | Col 43 | Col 44 | Col 45 | Col 46 |
| | | | K param uncertainty | Basic Type | Specific type | Serial number | Color | Size |

If certain fields of information can not be obtained from the device drivers, they are filled in with a question mark in the "HW.cfg" file, which causes the configuration manager program to prompt the user to fill in this missing data.

defaultVehiclePSEs.cfg & defaultGalaxyPSEs.cfg

Configuration files "defaultVehiclePSEs.cfg" 420 and "defaultGalaxyPSEs.cfg" 420 are flat files in the same format as "HW.cfg" 410. Files 420 show which PSEs belong to the galaxy and which PSEs belong to the vehicle. Each line from "HW.cfg" 410 is copied to one of files 420, and the missing fields (indicated by "?") are filled in with valid data. The files 420 do not change unless the hardware configuration changes. Pose refinements or new PSEs discovered by the SFC 200 while the SFC is running are saved to "autoVehiclePSEs.cfg" and "autoGalaxyPSEs.cfg" files 422.

autoVehiclePSEs.cfg & autoGalaxyPSEs.cfg

Configuration files "autoVehiclePSEs.cfg" 422 and "autoGalaxyPSEs.cfg" 422 are flat files in the same format as "defaultVehiclePSEs.cfg" 420 and "defaultGalaxyPSEs.cfg 420." Non-zero lines present in these files override the corresponding lines in the default files. If they do not correspond to any lines in the default files, they are treated as additional PSEs. The new information obtained by the SFC 200 during auto-calibration or auto-mapping is saved into the files 422. Thus, if something goes wrong with the auto-mapping process, or the user wishes to start mapping again in a different room, he may delete either or both of the files 422, and the system will start tracking next time using the defaults files 420, which still retain the original hardware configuration information that was created by the "sfcfg-Mgr.exe" 416 program using data from the "HW.cfg" file 410 and user input if needed.

sysPar.cfg

A configuration file "sysPar.cfg" 422 is a text file containing <name="value"> pairs, comments and section delimiters. This file is used to override default system parameters that govern how sfc.exe behaves. For example, a user can add a line such as StartupGalaxyMap="defaultGalaxyPSEs.cfg"
to over-ride the normal behavior, which is to combine all the lines of "defaultGalaxyPSEs.cfg" 420 and "autoGalaxyPSEs.cfg" 422, using the values from the latter where there is a conflict. Other parameters that may be set in this file include prediction, perceptual post-filter modes, genlock parameters, simulation modes, and parameters that govern how the system decides when to switch between SLAC, SLAM, and LO.

typeRules.cfg

A configuration file "typeRules.cfg" uses <name= "value"> pairs and lists the rules associated with each specificType of device that are needed by the scheduler to schedule that type of device. Some of these rules are:

(1) basicType membership.
(2) Compatibility list (which specificTypes of targets are detectable by a given specificType of sensor or vice versa. Since the specificType identification numbers are non-overlapping with the basicType numbers, one may list a basicType, and that will tell the scheduler that all specificTypes belonging to that basicType can be scheduled.)
(3) Conflict list (which specificTypes or basicTypes can not be scheduled at the same time as this specificType).
(4) Max repetition rate.
(5) FOV and or range limitations, or how to calculate them from the identifier, color and size attribute fields.
(6) Approximate resolution (used by the scheduler to decide which sensor/target pair will yield maximum information gain). A more exact expression for resolution depending on the specific location of the target relative to the sensor is implemented by the model response function of the driver dll when it returns an R matrix for use in the Kalman filter.
(7) Uncertainties of the 10 K-parameters.
(8) Formulas for how to apply the K-parameters to compensate sensor biases.

SpecificTypes are intended to become officially registered (e.g., through a registration web page that can be set up to allow third party developers to submit a set of type rules for a new specific type, and then receive a unique specificType ID code that is not already used by anyone.) This allows a developer to put a new device on the market and have it become compatible with future users of the architecture (and current users, who has to re-load the master "typesRules.cfg" file from the web-page in order to use the new devices). This registration process allows a new device to declare itself incompatible or compatible with certain older devices that are already registered in the database. A small number of user specificType codes are reserved so that a developer can perform in-house testing of new device types before registering them.

Operation of sfCfgMgr.exe and Interaction with Sensor Fusion System

When the navigation system boots up, a sensor fusion shell program "sfShell.dll" begins by asking the meta-driver 122 to query all the local drivers 402 and regional drivers 404 for status. The drivers go out and find all the connected hardware (e.g., PSEs 406 and IMUs 408), and return enumerated lists of devices that the meta-driver 122 concatenates into a master list and outputs as the file "HW.cfg" 410. The program sfShell.dll then invokes the configuration manager program "sfCfgMgr.exe," which ensures that the "default*.cfg" and "auto*.cfg" files are updated, consistent with the actual hardware devices, and represent a viable tracking configuration. When these criteria are met, program "sfCfgMgr.exe" returns a success signal to the program "sfShell.dll," which then proceeds to invoke the appropriate number of instances of sfCore.dll and cycle through them to acquire measurements and track locations of vehicles 100. If the criteria cannot be met, program "sfCfgMgr.exe" returns a failure signal to abort the program sfShell.dll, and issues an error message to the user to help with identification and correction of the problem.

Note that sfCfgMgr.exe is drawn as a standalone executable interfaced to sfShell.dll through a socket interface. This allows it to be invoked and run on a remote computer from the sensor fusion system itself. This capability could be very useful because the configuration manager 416 requires a GUI to obtain from the user any missing configuration information that could not be resolved by analyzing the information in HW.cfg. Since the tracking system 90 data processing unit 190 may be running on an embedded computer with minimal or no user interface capabilities, the ability to configure it from a remote computer such as a PC would be very useful. Alternatively, part of the configuration management logic could be implemented within the sfShell.dll program (or a .dll loaded by it), and the user-interface components of it may be implemented in a separate program. This might allow the portion running in sfShell to make its best guess about configuration if or when the user cannot be consulted.

Figure 9:
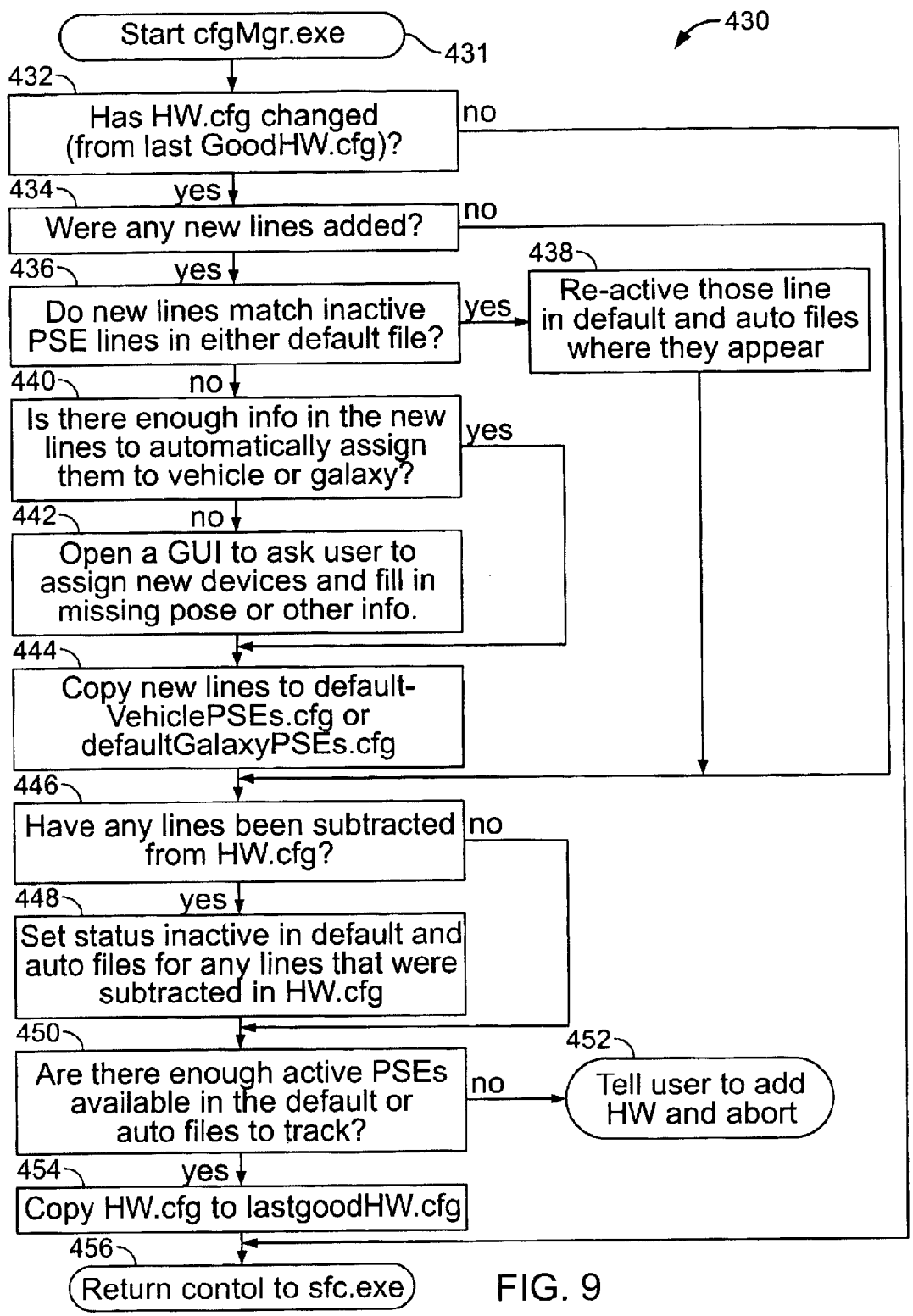
FIG. 9 shows a flow diagram of logic performed by a configuration manager program.

Referring to FIG. 9, a flow diagram illustrates a process 430 implemented by "sfCfgMgr.exe":

Step 431: the program "sfCfgMgr.exe" is started.
Step 432: the program "sfCfgMgr.exe" determines whether "HW.cfg" has changed, as compared to the "lastGoodHW.cfg." If not, skip to step 456.
Step 434: If "HW.cfg" has changed, then determine whether any new lines have been added. If not, skip to step 446.
Step 436: If new lines have been added, then determine whether the new lines match inactive PSE lines in "defaultVehiclePSEs.cfg" or "defaultGalaxyPSEs.cfg" or "autoVehiclePSEs.cfg" or "autoGalaxyPSEs.cfg"? If yes, then in step 438, re-activate the lines in the default configuration files and/or the auto configuration files where they appear. Then skip to step 446.
Step 440: If new lines do not match inactive PSE lines in the default files, determine whether there is enough information in the new lines to automatically assign the new lines to a vehicle or the galaxy. If yes, then skip to step 444.
Step 442: If there is not enough information in the new lines to automatically assign the new lines to a vehicle or the galaxy, open a graphical user interface (GUI) to ask the user to assign membership of new devices and fill in missing pose or other information.
Step 444: Copy new lines to "defaultVehiclePSEs.cfg" or "defaultGalaxyPSEs.cfg" depending on whether the new PSE has been identified as belonging to the galaxy or to a vehicle.
Step 446: Determine whether any lines have been subtracted from "HW.cfg." If not, skip to step 450.
Step 448: If there are lines that have been subtracted from "HW.cfg," set status inactive in default and auto configuration files for any lines that were subtracted in "HW.cfg."
Step 450: Determine whether there are enough active PSEs available in the default or auto configuration files to track. If not, then in step 452, tell the user to add additional hardware and abort with failure condition.
Step 454: Copy "HW.cfg" to "lastGoodHW.cfg."
Step 456: Return control to calling program with success condition.

When the system is used for the first time, there are "sysPar.cfg" and "typeRules.cfg" configuration files. When the program "sfShell.dll" starts, it asks its meta-driver 122 to find all the existing "sfDrvNNN*.dll" drivers 402, and in turn ask each driver to enumerate all the hardware it can find that is physically connected and responding. The complete list is output to the file "HW.cfg" 410. The program "sfShell.dll" then invokes the program "sfCfgMgr.exe." Because "HW.cfg" 310 has changed (relative to the non-existent or empty "lastGoodHW.cfg"), the "sfCfgMgr.exe" program will attempt to automatically create the files "defaultVehiclePSEs.cfg" and "defaultGalaxyPSEs.cfg," using information obtained from the drivers about how each sensor or target device is disposed relative to the vehicle or the galaxy (in general, this is possible when the user has plugged in factory assembled stations that contain this information in their EEPROM descriptors).

If the information in the devices is not sufficient, the "sfCfgMgr.exe" program prompts the user to fill in the required information, and then creates the default files. If the resulting default configuration is deemed valid, the "sfCfg-.Mgr.exe" program then passes control back to the calling program. Since there are no auto files to override the default files, the SFC 200 will begin tracking using the information in the default files.

After the SFC starts tracking, the default files contain the approved, fully-assembled hardware description for the configuration. Typically, this information does not need to change unless the user re-assembles the vehicle or the active FPSEs in the galaxy. Information about passive fiducial arrays (or natural features) is automatically generated by the auto-mapping function of the SFC and stored in the "auto-GalaxyPSEs.cfg" file without harming the default files. If the user wishes to take the same vehicle to a new location and begin auto-mapping, he can delete or rename the "auto-GalaxyPSEs.cfg" file. Likewise, if he wishes to re-calibrate the vehicle, he can delete the "autoVehiclePSEs.cfg" file.

5 Using the System for Simulation

An advantage of the described software system is that it can be used to perform Monte Carlo simulation and covariance analysis of a contemplated tracking configuration before developing or installing any actual hardware. The software can be used to decide what types of new devices to develop and what performance specifications they require for any given application and device layout.

A simulation is performed by using the following process:

(1) Add a line <mode="simulated"> in "sysPar.cfg" file.
(2) Add a line of the form <simIMUtype="imuIC2"> in "sysPar.cfg" file.
(3) Manually construct the files "defaultVehiclePSEs.cfg" and "defaultGalaxyPSEs.cfg" to represent the "true" configuration of PSEs to be simulated. Unlike normal operation where "defaultGalaxyPSEs.cfg" might contain just a seed map, in simulation mode, it contains the full list of the PSEs that might be used during the course of the entire simulation. To inform the simulation that only the first 4 PSEs are pre-known for an auto-mapping experiment, give those 4 low covariance values, and give the others high covariance values. The covariances will be ignored by the sensor/target meta-driver, which will treat the pose values in the default files as absolute truth for the purpose of creating simulated measurements. However, the SFC will add random errors to the PSEs proportional to covariance values when it initializes its internal data store maps, and it will pay attention to the covariances in deciding which PSEs it can schedule. As it adds new PSEs to the "known" portion of the map, it will save the reduced covariances and refined pose estimates into the "auto-GalaxyPSEs.cfg" file, which can be compared afterwards to the "defaultGalaxyPSEs.cfg" file to determine how closely the auto-mapping process converged to the true PSE positions.

(4) Copy a mat-file containing the desired simulated trajectory data to the directory where the SFC resides and name it "trajectory.mat."

The currently supported IMU types include, e.g., "imu100", "imuIC2," "imuIT2," "imuCommercial," "imuTactical," "imuNavigation," "imuStrategic," "imuPerfect," "imuNone," and "imuCustom." If "imuCustom" is selected, then many additional parameters defining simulated IMU performance are added to the "sysPar.cfg" file. The non-custom types already contain pre-defined combinations of parameters (e.g. angle random walk, bias random walk, initial bias uncertainty, scale factor uncertainty, etc.) which are used to simulate the performance of different grades of IMU.

In the simulation mode, the "sfShell.dll" program skips the startup steps of asking the meta-driver to enumerate hardware and output the concatenated list of devices to the file "HW.cfg" and invoking "sfCfgMgr.exe" file. Thus, it proceeds immediately to acquisition and tracking using the user-generated "default*.cfg" files. In the simulation mode, if any hardware devices are connected, they are ignored. The drivers are passed an exact sensor-target pose (which is calculated in the MMU using vehicle pose data that comes from the "trajectory.mat" file) and exact true poses of the MPSE and FPSE (which come from the "defaultVehiclePSEs.cfg" and "defaultGalaxyPSEs.cfg" files respectively) and told to provide simulated data (by adding biases and noise).

In the normal mode, the initial vehicle and galaxy PSE maps are loaded into internal data store memory by first reading in all lines from the default files, and then reading in the auto files if they exist and overwriting the data from the default files. Therefore, both auto files are deleted before running a simulation, since they contain PSE pose values which no longer match the truth values defined in the default files. To simulate an ordinary tracking experiment with no auto-mapping or auto-calibration, the PSE covariances in the default files are set to zero.

6 Alternative System Architectures

Tracking system 90 can be used to track a single vehicle or multiple vehicles. Multiple vehicles can be used to track different parts of an object, such as body parts of a person. Multiple vehicles may also be used to track a group of people or robots or objects in a common environment. Multiple vehicles can also increase the speed and accuracy of map building since more data is available from the sensors of multiple vehicles to collaboratively construct the map.

Where multiple vehicles are tracked, the states of different vehicles can be updated centrally or the processing may be distributed between multiple SFCs running on the same data processing unit or separate data processing units. In a centralized multi-vehicle navigation system, one SFC receives sensor inputs from all vehicles, performs tracking and auto-calibration, and map building for all vehicles. States of multiple vehicles are appended to the state vector of the single SFC and propagated through the update filter to create an optimal algorithm for collaborative mapping.

Figure 10:
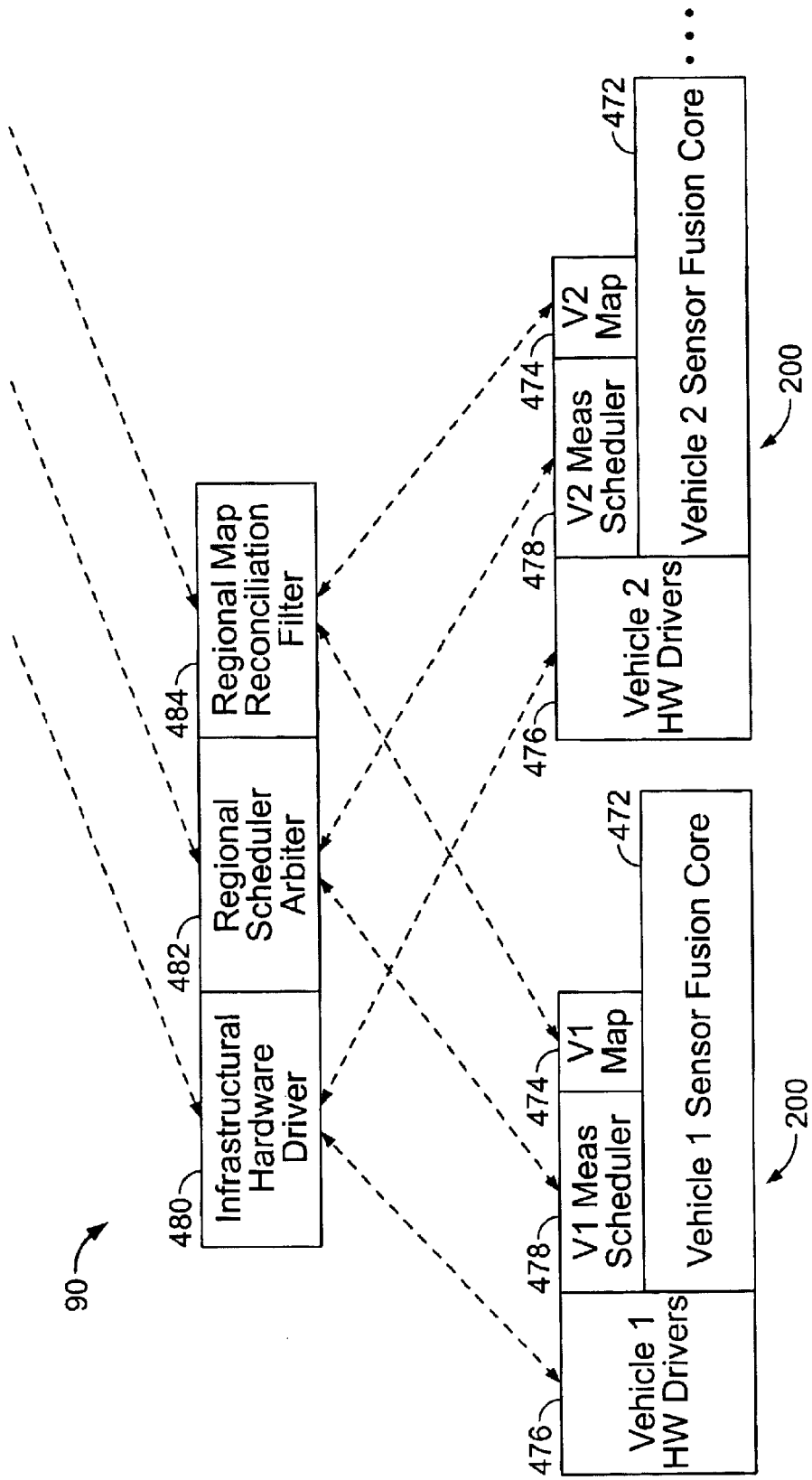
FIG. 10 shows a block diagram of an architecture for a multiple vehicle navigation system.

Referring to FIG. 10, in a fully distributed multi-vehicle system, the navigation system utilizes multiple vehicles 470 in which each vehicle has its own data processing unit 190, with its own hardware drivers 476 (which could include a meta-driver 122, local drivers 402 and/or regional drivers 404) and SFC 200 to perform its tracking and possibly auto-calibration or auto-mapping. Each vehicle 470 builds its own private environment map 474 representing the portion of the environment 106 it sees. Each vehicle has hardware drivers 476 that collect data from PSEs private to the vehicle, and possibly also from PSEs that are shared among vehicles through an infrastructural hardware driver 480 which communicates with each vehicle 470 during the enumeration process to notify the vehicles what shared PSEs are available.

Each vehicle 470 has a measurement scheduler 478 that schedules which PSEs to use for each measurement cycle. A regional scheduler mediator 482 communicates with the measurement scheduler 478 of each vehicle to resolve conflicts in utilizing shared PSEs.

The private environment maps 474 developed by one vehicle 470 may or may not be shared or merged with the private environment maps 474 developed by other vehicles 470. A regional map reconciliation filter 484 reconciles the private environment maps based on a number of factors. For example, if certain PSE position estimates from one vehicle are known to be more accurate, either because its sensors are more accurate or because it is located at a more favorable geometric location with respect to certain targets, the private environment map from that vehicle or a portion of the private environment map relating to those certain targets may be given more weight in the map-merging process. The position estimates and associated covariances for a given PSE provided by different vehicles may be fused using the information fusion form of Kalman filter update equations, such as given in section 2.4 of "Towards Generalized Sensor Fusion Architecture for Distributed Real-time Tracking, Auto-calibration and Environment Mapping" by Eric Foxlin, attached to provisional application No. 60/402,178, filed Aug. 9, 2002. If the fused map or portions of it are redistributed to the vehicles after a merge, algorithms should be designed to avoid potential filter divergence problems that could result from violation of the Kalman filter assumption of uncorrelated measurement noise.

In an alternative distributed system architecture, each vehicle has its own SFC to update its own states, but multiple SFCs are running on one data processing unit 190, as illustrated in FIG. 7. This data processing unit may be physically connected to one of the vehicles, or it may a separate computer receiving data by equivalent connections from all the vehicles.

In an alternative distributed system architecture, the responsibility of central command may transfer from one vehicle to another. Each vehicle independently stores the system states, and under certain circumstances, such as when the vehicle currently serving as central command malfunctions or when it loses communication with other vehicles, another vehicle takes over and assumes the responsibility of the central command.

In an alternative distributed system architecture, each vehicle has its own SFC and storage that stores the system states. Depending on circumstances, one or more vehicles may serve as central commands that actively receives sensor inputs from other vehicles and updates the states for itself and other vehicles. The vehicles not acting as central commands pass their sensor inputs to the central commands, receive the system states returned from the central commands, and store the system states in a local storage.

Initially, when all of the vehicles are within communication range, one vehicle may serve as the central command. As the vehicles navigate the environment and roam farther and farther away from each other, one or more vehicles may break off communication. When a vehicle breaks off communication with the central command, the vehicle activates its SFC and uses its own SFC to proceed with the task of localization, calibration, and map building. The central command, after noticing that a fellow vehicle has broken off communication, can either treat the sensors from the fellow vehicle as unavailable, or may reconfigure its update filter to reflect the changes.

When the fellow vehicle regains communication with the central command, a fusion process may be performed in which the system states of the fellow vehicle is fused with the system states of the central command, and then the fellow vehicle cedes the responsibility of updating the system states to the central command.

Because the navigation system implements an enumeration process to determine availability of sensors and a self-configuration process to set up the vehicle and environment maps according to sensor configurations, there is much flexibility in how the multiple vehicles cooperate to obtain the most accurate measurements. For example, the central command may dispatch "sentries" to navigate closer to a target in order to obtain more accurate measurements of the target. The sentry may send back data to be fused with data owned by the central command, or the sentry may simply become another target that can be used as a navigation reference point.

In this architecture, each vehicle has a sensor fusion core (SFC) associated with it to perform its tracking and auto-calibration, and to build its own private version of the part of the map it sees, which may or may not be shared or merged with map fragments developed by other vehicles. The SFC may either be a dedicated processor running onboard the vehicle, or just a process or thread running inside a server somewhere. Each SFC has a DRU containing the vehicle state, a vehicle map containing pointers to all the PSEs attached to the vehicle, and an environment map containing pointers to all the environment-fixed PSEs the vehicle is currently using.

The following describes an example of how a multi-vehicle navigation system determines which pair of PSEs to use for measurement in each measurement cycle. In a first scenario, only one measurement is made during each cycle. Referring to FIGS. 3, 6, and 8, the MMUs 304 in all the SFCs 200 send their wishlists to an arbiter 418, which can be part of sfShell 412. For any hardware which is not under the direct control of the local sfShell, the arbiter may in turn consult a regional mediator 482 Having received wish lists from all vehicles in the current cycle, the arbiter picks a pair of PSEs that are available to make a measurement in the next cycle so that the measurement will result in the highest overall information gain to the navigation system 90, taking all vehicles into consideration.

On the next cycle, the arbiter sends a message to the MMU 304 in each of its SFCs, indicating that the MMU 304 is allowed to make a measurement using the selected pair of PSEs. In turn, the MMU 304 sends a message to the meta-driver to setup a PSE driver corresponding to the selected pair of PSEs to perform a measurement. Once all the SFCs have made a request to setup the same measurement (as they have been directed to do by the arbiter) the sfShell sends a trigger command to the meta-driver to initiate the actual hardware measurement process. The actual measurement may take many cycles to complete. Therefore, in each cycle, the MMU 304 typically receives a measurement that it requested a number of cycles earlier. For shared measurements, the measurement is requested by multiple vehicles, completed once by the meta-driver, then the same result is returned to all the requesting vehicles to utilize in their respective update filters.

In the second scenario, different vehicles are allowed to make different measurements simultaneously as long as the measurement by one vehicle does not interfere with measurements by other vehicles. Each MMU 304, in addition to generating a wishlist of shared PSEs, also generates a wishlist of private PSEs. The term "private" means that the PSE is not shared by SFCs of other vehicles.

An example of a shared PSE is an ultrasound emitter whose chirps can be received by microphones on multiple vehicles. When there are multiple ultrasound emitters in close range, typically only one emitter is allowed to chirp at a time so as to prevent interference from the multiple emitters. Each microphone has its own timer and can determine the distance to the emitter by measuring a time difference between the trigger of the chirp and the reception of the chirp.

When one or more PSE are shared among SFCs, it is necessary to arbitrate among the needs of the SFCs to determine which PSE will result in a measurement having the highest overall benefit to the navigation system. For example, when there are two ultrasound emitters, the first emitter may be closer to a first vehicle but far away from a second vehicle. The second emitter may be farther to the first vehicle than the first emitter, but the average distance to both vehicles may be smaller than that of the first emitter. Thus, triggering the second emitter may result in a measurement having a higher overall information gain to the navigation system. Of course, the benefit of a measurement also depends on the level of need in the vehicles, so if one vehicle as a large pose estimation error covariance in a particular direction, the arbiter may schedule a beacon in that direction, even if there are other beacons which could provide slightly higher information gain to a larger number of vehicles.

The MMUs 304 send the shared and private wishlists to the arbiter on each cycle. For each PSE pair on the private wishlist, the arbiter immediately marks it available if it is not busy, thus allowing it to be scheduled on the current cycle. For the shared wishlist, however, it waits until it has received the shared wishlists from all vehicles at the end of the cycle, then makes a decision, and returns that decision to the vehicles in the next cycle. Thus, on each cycle, the MMU will be authorized to use any of its private PSEs that are not busy, or to use the selected pair involving shared hardware from what it requested last cycle. The MMU can choose either one of its private PSE pairs or the shared pair, whichever yields highest information gain for its own vehicle. However, if the shared pair yields almost as much gain as the best private pair, it may choose the shared pair because it knows that opportunity will only be available for a very limited time. The shared device will now be activated as long as at least one vehicle decides to request a pair involving it. On a given cycle, some vehicles may choose to ignore the authorized shared measurement opportunity and schedule private measurements using different non-interfering sensors. Different vehicles can be making different measurements using different sensors at the same time, as long as they do not interfere with each other. The arbitration process is designed to prevent vehicles from scheduling measurements that may interfere.

As an example, a navigation system may be used to track body parts of a person in a room where a number of ultrasound speakers are installed on the ceiling. During the tracking process, only one ultrasound speaker may be triggered to chirp at a time. A first vehicle to be tracked may be placed on the person's head, a second vehicle to be tracked may be placed on the person's hand, and a third vehicle to be tracked may be placed on the person's leg: The vehicles contain microphones to measure the ultrasound chirps. The MMU of each vehicle generates a wishlist of pairs of PSEs (each pair including a speaker and a microphone). In generating the wish list, the MMU assigns a selfish information gain value (i.e. the gain for its own vehicle) to every combination of speaker-microphone pair.

At the $k^{th}$ cycle, the MMUs of the vehicles send their wishlists to the arbiter 418. The arbiter responds by specifying a pair of PSEs which includes a shared speaker that was selected based on the wishlists submitted at the $(k-1)^{th}$ cycle. During the $k^{th}$ cycle, the arbiter gathers the wishlists from the MMUs and uses an algorithm to decide which speaker will maximize the information gain of as many vehicles as possible on the $(k+1)^{th}$ cycle. In this example, only one speaker chirps, and one microphone in each vehicle makes a measurement. At the $(k+1)^{th}$ cycle, the arbiter sends messages to tell the MMUs which speaker will chirp and which microphones have been granted permission to measure the chirp. After all of the MMUs send setup messages to ultrasonic hardware driver preparing it to chirp the same speaker and measure the time of flight to their different respective microphones, the sfShell will send a trigger message to the ultrasonic hardware driver. The driver then simultaneously chirps the speaker and starts the counters in all the microphones that have been setup for the measurement. A number of cycles later, the ultrasonic hardware driver returns the measurement results to the MMUs.

7 IMU and DRU Automatic Configuration

The DRU is responsible for predicting the estimate of vehicle pose forward at each time step, and providing the time varying linearized $\Phi$ and Q matrices to the update filter 306 that it will use to propagate forward the covariance matrix $P_{xx}$ representing the uncertainty in the vehicle pose estimate. The DRU may propagate the predicted pose based on inputs from interoceptive sensors or without any sensor inputs.

If there are no sensor inputs to the DRU, the pose prediction will be based on some assumed dynamical process model of the object being tracked. Two popular such process models are the constant velocity model driven by white-noise acceleration, or the constant acceleration model driven by white-noise jerk.

If the enumeration process has identified the existence of any interoceptive sensors, it will also obtain parameters from the TEDS in the sensors describing what type of sensors they are and what measurement characteristics they possess, and save all these parameters into an IMU.cfg file. This file is read by the DRU and allows it to configure itself in an appropriate mode to perform the pose propagation by integrating the measurements received from the sensors on each cycle. The parameters describing the stochastic model of the interoceptive sensors are used by the DRU to formulate the appropriate matrices $\Phi$ and Q. For example, if the interoceptive sensors identify themselves as a standard IMU providing measurements of $\Delta\theta$ and $\Delta v$ on each cycle, then the DRU will implement inertial integration equations for updating the pose estimate and implement for $\Phi$ a state transition matrix representing the propagation of pose and velocity errors as a result of inertial sensor errors, and it will calculate Q based on such IMU parameters as gyro angle random walk, bias random walk, initial bias uncertainty, scale factor uncertainty, misalignment uncertainty, and all the equivalent parameters for accels. On the other hand, for odometry sensors, there would be different integration equations implemented, a different state transition matrix generated, and different stochastic parameters required to generate the process noise matrix.

8 Applications of Tracking, Auto-calibration and Map-building System

Figure 11:
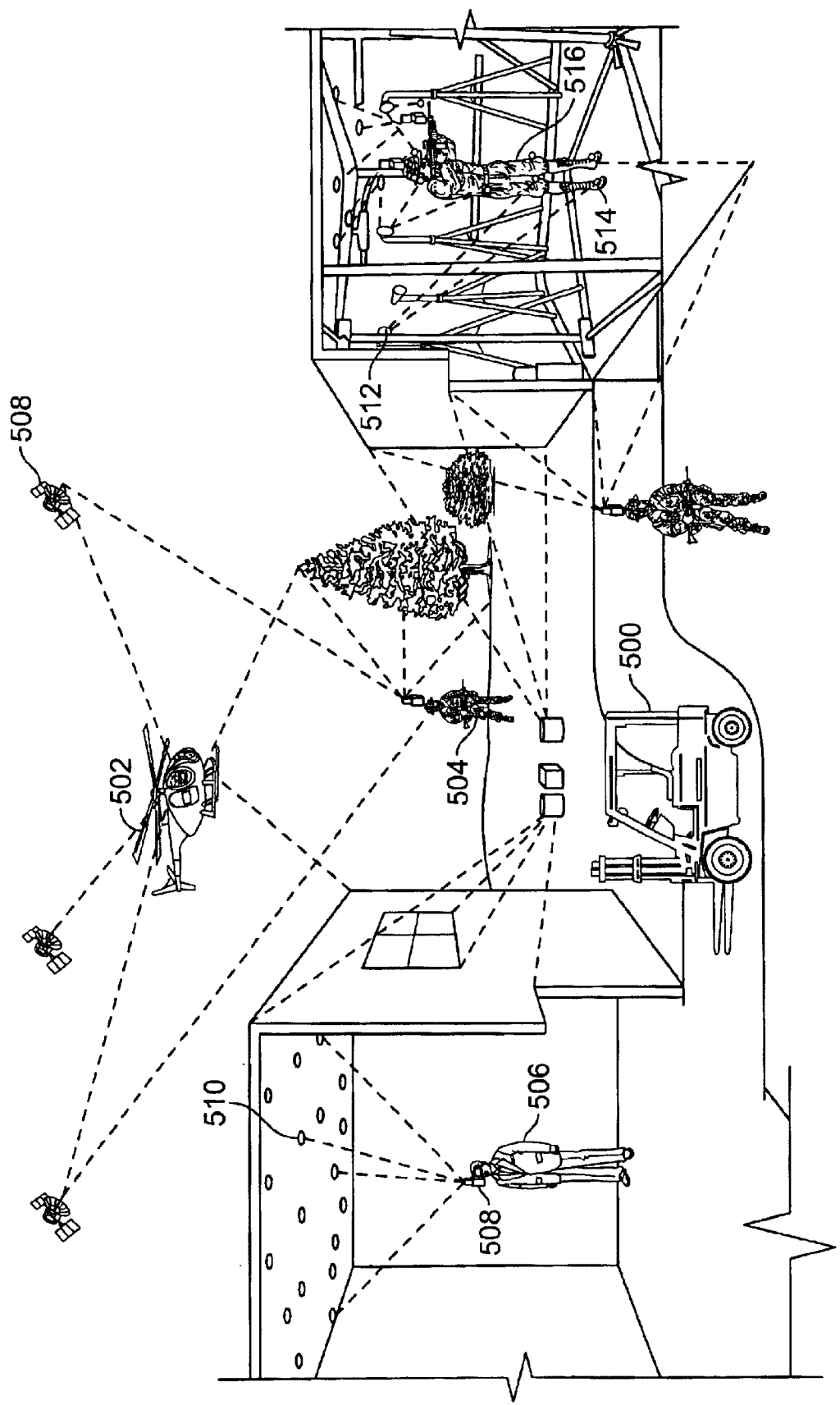
FIG. 11 illustrates applications of the navigation system.

Referring to FIG. 11, navigation system 90 can be used in many applications, such as to navigate a forklift 500 in a factory environment, to track a helicopter 502 or a soldier 504 in a battle field, or to track a person 506 in an indoors environment. An inside-out measurement can be used in which a sensor 508 attached to person 506 makes a measurement with respect to a target 510. An outside-in measurement can be used in which a sensor 512 attached to the environment makes a measurement with respect to a target 514 attached to a person 516.

In some applications, the primary goal of the system is to provide a means of navigation or tracking. If auto-mapping is used at all in such an application, it is done to provide a reference map for the purpose of the tracking. The map may be discarded after the tracking or navigation activity is complete, or it may be saved for future tracking or navigation activities in that environment. These types of applications are frequently discussed in the robotics literature under names like simultaneous localization and map-building (SLAM) or concurrent mapping and localization (CML).

In other applications, the map itself may be the primary product of interest. For example, a camera may be moved through a building, finding existing natural features such as corners and adding them to the map as PSEs. The map representation could be augmented to include information about lines connecting the corners together. Eventually a 3D model of the building will be formed which can be converted into a CAD model for as-built documentation and use in architectural planning. If the camera captures images and stitches together fragments of images to create texture maps which can be associated with the polygons in the CAD model, the result would be a virtual reality (VR) model of the environment, created rapidly and either automatically or semi-automatically with minimal user interaction. These types of applications, where the goal is more to capture the 3D structure of the environment rather than track a vehicle's motion, are often discussed in the computer vision literature under names like structure-from-motion or scene modeling.

9 Alternative Embodiments

It is to be understood that the foregoing description is intended to illustrate and not to limit the scope of the invention, which is defined by the scope of the appended claims. Other embodiments are within the scope of the following claims.

Figure 12:
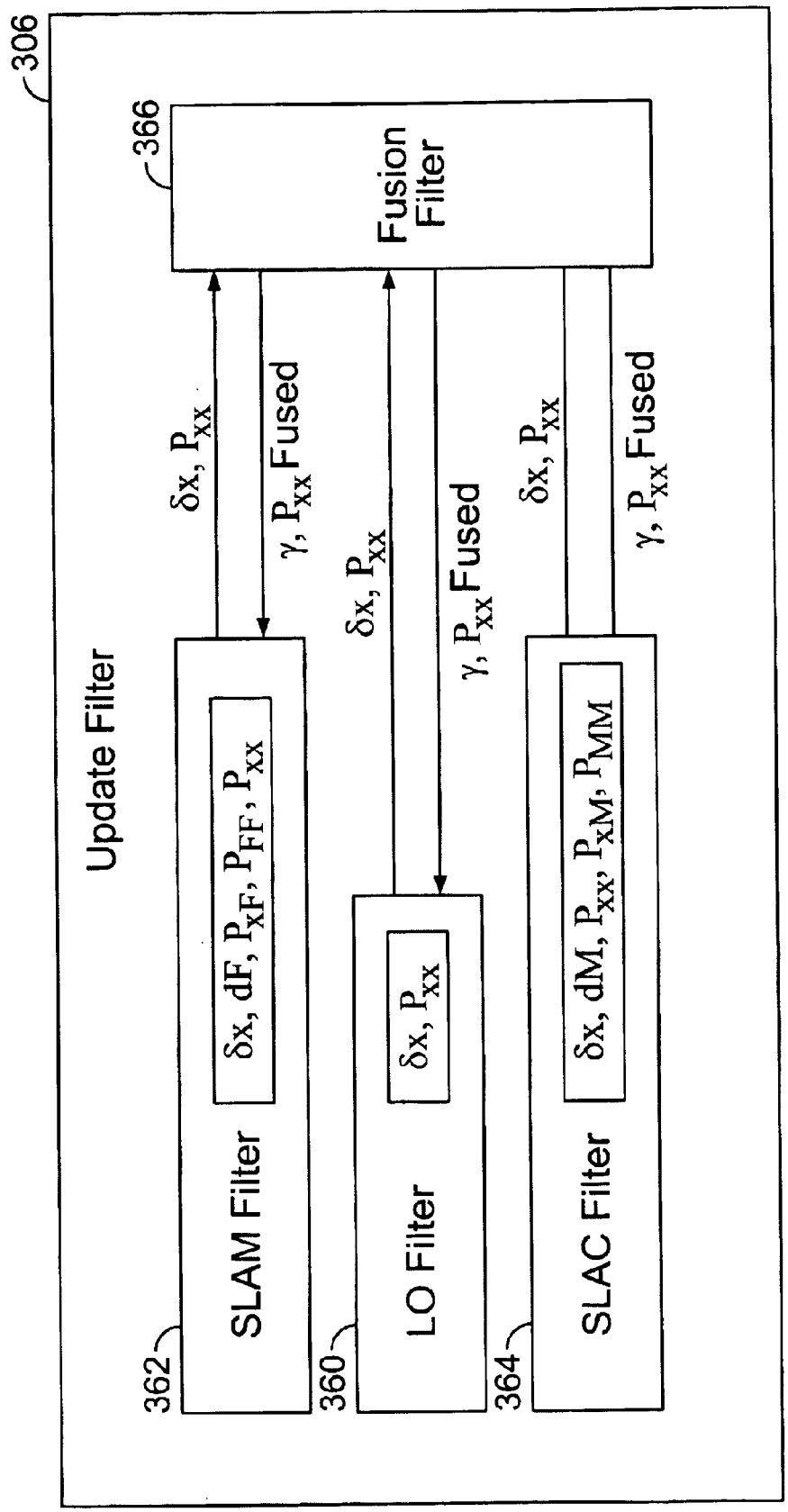
FIG. 12 shows a distributed Kalman filter.

For example, referring to FIG. 12, the update filter 306 can be a distributed Kalman filter, such as a Federated Kalman filter, that includes a number of filter components. Update filter 306 may include a SLAC filter (which stores and updates $\delta x$, $\delta M$, $P_{xx}$, $P_{xM}$, and $P_{MM}$), a SLAM filter (which stores and updates $\delta x$, $\delta F$, $P_{xx}$, $P_{xF}$, and $P_{FF}$), and an LO filter (which stores and updates $\delta x$ and $P_{xx}$).

The SLAC filter 364 estimates errors in the underlying MPSE poses and biases, and sends the corrections vector $\delta M$ back to the vehicle map manager 314, which applies the corrections to the appropriate MPSE fields with appropriate translation of orientation format.

Similarly, the SLAM filter 362 sends error correction estimates back to the environment map manager 310, which applies the corrections to the appropriate FPSE fields with appropriate translation of orientation format.

The LO filter 360 is used when the user or the navigation system 90 decides that both auto-calibration and mapping are done, and turns off the SLAC filter 364 and SLAM filter 362. Any one, two or three of the filters may be active at a given time.

Because each of the three local filters in this federated filter bank is a reduced-order Kalman filter which leaves out certain states that were present in the full-order centralized filter, techniques such as a Schmidt-Kalman filter algorithm or just "bumping up" the noise assumed in the measurement model should be used to assure stability and best performance. To facilitate this, during the incorporation of a measurement between $FPSE_i$ and $MPSE_j$, the SLAM filter 362 sends $P_{f_i f_i}$ (error covariance of $FPSE_i$) to LO filter 360 and SLAC filter 364 and the SLAC filter 364 sends $P_{m_j m_j}$ (error covariance of $MPSE_j$) to LO filter 360 and SLAM filter 362.

When more than one of the local filters 360, 362, and 364 are running in parallel, the fusion filter 366 is used after all the local filters have completed their measurement updates to fuse their individual estimates of vehicle pose error ($\delta$xSLAM, $P_{xx}$SLAM), ($\delta$xSLAC, $P_{xx}$SLAC), and ($\delta$xLO, $P_{xx}$LO) into a fused estimate ($\delta$xFused, $P_{xx}$Fused). Then $\delta$xFused is sent to the DRU to correct the vehicle pose states, and $P_{xx}$Fused is sent back to each of the local filters to perform the fusion reset equations of the federated filter algorithm. The fusion reset equations in the SLAM filter result in another correction $\delta F$ being sent to the environment map manager, and likewise for the SLAC filter. Further details and references concerning the federated filter and distributed Kalman filtering are in the article "Towards a Generalized Sensor Fusion Architecture for Distributed Real-time Tracking, Auto-calibration and Environment Mapping," attached to provisional application No. 60/402,178, filed Aug. 9, 2002.

In order to accommodate large galaxy maps, there may be many SLAM filters within the distributed filter bank, each responsible for updating a submap or portion of the entire map. These submaps may be disjoint or overlapping. One, several, or all of the SLAM submap filters may be active at a given time. For example, the environment map could be partitioned into rooms, and when the vehicle is in a particular room, only the SLAM filter which updates PSEs in that room is active. When the robot transitions from one room to another, the federated filter fusion reset equations are used to transfer the vehicle state estimate covariance matrix into the new room's SLAM filter, and update the stale PxF and PFF matrices in the new filter based on the change in Pxx which has occurred compared to the stale Pxx matrix left in the new SLAM filter since the last time it was active. This map transition process is similar in effect to the submap transition algorithm of Leonard and Feder. For smoother transitions as the robot moves between submaps, there may be several submap SLAM filters around the robot active at any given time, and as the robot moves forward, submaps behind it de-activate and ones in front activate.

If there will be a maximum of N submap filters active at any given time, then the bank of filters in the federated filter implementation would only need to contain N SLAM filters. When the vehicle moves, the SLAM filter corresponding to the submap behind it de-activates first and transfers its latest information into the environment map manager. Then, a group of PSEs in the area the vehicle is approaching are transferred from the environment map manager into the now vacant SLAM filter memory store.

Data processing unit 190 can either reside in vehicle 100 or be located outside of vehicle 100. Measurements from sensors 102 and IMU 104 may be transmitted wirelessly to a server computer located at a base station, the server computer updates the vehicle states, vehicle maps, and environment maps based on the measurements, and sends the updated vehicle states, vehicle maps, and environment maps back to vehicle 100 for storage in a memory in vehicle 100. The vehicle states, vehicle maps, and environment maps may also be stored at the base station, so vehicle 100 has little onboard computation power, and only carries sensors 102, IMU 104, communication devices, and perhaps motor control mechanism for controlling the movement of vehicle 100.

A vehicle with higher processing power may be used with vehicles with less processing power. The vehicle with less processing power sends measurement data to the vehicle with higher processing power, which updates the vehicle states, vehicle maps, and environment maps, and sends the updated information back to the vehicle with less processing power. In this way, lower cost navigation robots can be used with a more expensive navigation robot to explore a terrain.

The term "vehicle" can mean any object, from as small as an atom to as large as a planet. In a multi-vehicle system used to track movements of a person, a vehicle can be a tracker mounted on the person's head, and another vehicle can be a second tracker mounted on the person's wrist.

The auto-calibration process may also refine calibration parameters provided by the manufacturers of the sensors, where the calibration parameters have limited accuracy.

The pose of a target relative to a sensor does not necessarily have to be expressed as $\lambda_{ij}=(\theta_i,\phi_i,\theta_j,\phi_j,l_{ij},t_{ij})$. Other representations may be used as well. For example position of target relative to sensor may be specified using Cartesian or polar or other coordinate systems. Orientation may be expressed with euler angles, quaternions, rotation matrices, or rotation vectors. For some PSEs, orientation parameters may not be important, in which case no corresponding filter states need be allocated. For example, for a circular fiducial mark, the orientation is only used to determine visibility, and perhaps to calculate a centroid correction for perspective distortion. It should suffice to enter an approximate orientation and not update the orientation during the iterative measurement cycles. By comparison, for a camera, because the aim of camera lens is important, the orientation are included in the state vector so that measurements from the camera can be interpreted, and if auto-calibration is desired the extended Kalman filter can refine the alignment.

The pose of the vehicle relative to the galaxy, the FPSEs relative to galaxy, or the MPSEs relative to the vehicle may also be expressed in different formats or with fewer than 6 degrees of freedom. For example, in 2D navigation problems it is common to express the robot pose using just x, y and heading.

Various methods of auto-calibration may be used. In one implementation, navigation system 90 gathers information from a number of measurements from different sensors, and determines whether measurement values from a particular MPSE have a high percentage that are consistently offset from an estimated measurement value computed based on measurements from other sensors. The navigation system 90 calculates an estimate of the pose of the particular MPSE relative to the vehicle so that, using the estimated pose, the measurement values from that particular sensor more closely match the estimated measurement values based on measurements from other sensors. The auto-calibration parameters may be initialized to very accurate values through precise mechanical alignment fixtures, and then no auto-calibration are performed, or they may be initialized to approximate values and then refined by the real-time iterative auto-mapping process described above. Alternatively, they may be estimated by a batch process after collecting a certain amount of data.

When an MPSE is first installed on vehicle 100, instead of having a user manually enter the MPSE pose information, the MPSE may communicate with other sensors upon initialization of the navigation system 90 to compute an initial estimate of its pose relative to the vehicle. The initial pose estimate is subsequently calibrated by the navigation system 90 using measurements from other sensors.

The navigation system 90 may automatically calibrate measurement biases inherent in the MPSEs. For example, a specification sheet of an ultrasound range finder may specify that readings from the range finder are to be deducted by a preset value. Due to manufacturing tolerances, the readings may actually have to be deducted by a different value. Such biases may be calibrated using the method described above for calibrating poses of the MPSEs.

What is claimed is:

1. A method for tracking an object comprising:
    coupling a sensor subsystem to an estimation subsystem, said sensor subsystem enabling measurement related to relative locations or orientations of sensing elements;
    accepting configuration data from the sensor subsystem;
    configuring the estimation system according to the accepted configuration data;
    repeatedly updating a state estimate, including
        accepting measurement information from the sensor subsystem, and
        updating the state estimate according to the accepted configuration data and the accepted measurement data.

2. The method of claim 1 wherein coupling the sensor subsystem to the estimation subsystem includes coupling software modules each associated with one or more of the sensing elements.

3. The method of claim 2 wherein each of the software modules provides a software interface for receiving information related to an expected sensor measurement and providing measurement information that depends on said received information.

4. The method of claim 3 wherein each of the software modules implements calculations that are independent of a representation of the state in the estimation subsystem.

5. The method of claim 1 wherein the state estimate characterizes an estimate of a location of the object.

6. The method of claim 1 wherein the state estimate characterizes configuration information for one or more sensing elements fixed to the object.

7. The method of claim 6 wherein the configuration information for the one or more sensing elements fixed to the object includes information related to position or orientation of said sensing elements relative to the object.

8. The method of claim 6 wherein the configuration information for the one or more sensing elements fixed to the object includes operational parameters for the one or more sensing elements.

9. The method of claim 1 wherein the state estimate characterizes configuration information for one or more sensing elements fixed in an environment of the object.

10. The method of claim 9 wherein the configuration information for one or more sensing elements fixed in the environment of the object includes a map of the locations of said sensing elements.

11. The method of claim 1 wherein repeatedly updating the state further includes:
    providing to the sensor subsystems information related to an expected sensor measurement; and wherein accepting the measurement information from the sensor subsystem includes accepting information related to an actual sensor measurement.

12. The method of claim 11 wherein providing the information related to an expected sensor measurement includes providing information related to a relative geometric configuration of two of the sensing elements.

13. The method of claim 12 wherein providing information related to a relative geometric configuration of the two of the sensing elements includes providing information characterizing a relative location of said sensing elements.

14. The method of claim 11 wherein accepting the information related to an actual sensor measurement includes accepting information enabling the estimation subsystem to calculate a difference between the actual measurement and the expected measurement.

15. The method of claim 11 wherein accepting the information related to an actual sensor measurement includes accepting information for correlating measurements and geometric relationships between sensing elements.

16. The method of claim 15 wherein the information for correlating measurements and geometric relationships between sensing elements includes a mapping between a relative pose of the sensing elements and a sensor measurement.

17. The method of claim 16 wherein the mapping between the relative pose of the sensing elements and the sensor measurement characterizes a linear mapping.

18. The method of claim 11 wherein accepting the information related to an actual sensor measurement includes accepting information characterizing an uncertainty in the actual measurement.

19. The method of claim 18 wherein the information characterizing the uncertainty in the actual measurement includes parameters of a statistical distribution of an error of the actual measurement.

20. The method of claim 1 wherein repeatedly updating the state further includes:
selecting a pair of sensing elements for measurement; and
providing an identification of the selected pair to the sensing subsystem.

21. The method of claim 20 wherein selecting the pair of sensing elements includes selecting said elements according to an expected utility of a measurement associated with said elements to the updating of the state.

22. The method of claim 11 wherein repeatedly updating the state further includes:
updating the state according to the accepted information related to an actual sensor measurement.

23. The method of claim 20 wherein repeatedly updating the state further includes:
updating the state according to accepted measurements from inertial sensors.

24. The method of claim 1 wherein updating the state estimate includes applying a Kalman Filter approach.

25. The method of claim 1 wherein each of said sensing elements comprises at least one of a sensor and a target.

26. The method of claim 25 wherein the target comprises an active device that interacts with the sensor.

27. The method of claim 26 wherein the target comprises at least one of a man-made signal reflector and a natural feature of an environment.

28. The method of claim 1 wherein the object is selected from a group consisting of a vehicle, a robot, a person, a part of a person, a flying object, a floating object, an underwater moving object, an animal, a camera, a sensing apparatus, a helmet, a tool, a piece of sports equipment, a shoe, a boot, an article of clothing, a personal protective equipment, a rigid object having a dimension between 1 nanometer to 109 meters.

29. The method of claim 1 wherein the state estimate comprises information related to a position or an orientation of the object relative to a reference coordinate frame.

30. A sensor module comprising:
a sensor interface for communicating with a measurement sensor;
a communication interface for communication with an estimation system;
wherein the sensor module is configured to
receive information related to an expected sensor measurement over the communication interface,
receive a measurement signal over the sensor interface,
provide measurement information based on the measurement signal over the communication interface.

31. The sensor module of claim 30 wherein the sensor module is configured to provide information over the communication interface related to an uncertainty in the measurement information.

32. The sensor module of claim 30 wherein the received information related to an expected sensor measurement includes a predicted pose of a sensing element relative to the measurement sensor.

33. A method comprising:
enumerating a set of sensing elements available to a tracking system that includes an estimation subsystem that estimates a position or orientation of an object;
providing parameters specific to the set of sensing elements to the tracking system to enable the estimation subsystem to be configured based on the parameters specific to the set of sensing elements; and
generating a sequence of candidates of pairs of sensing elements selected from the set of sensing elements, the sequence based on an expected utility of a measurement associated with said elements to the estimation subsystem.

34. The method of claim 33, further comprising selecting a pair of sensing elements from the sequence of candidates, the selected pair of sensing elements being ready to make a measurement at the time of selection of the pair or at a predefined time after the time of selection of the pair, the selected pair having highest expected utility of a measurement among the sequence of candidates.

35. The method of claim 33 wherein the set of sensing elements comprises at least one sensor and at least one target, the sensor making a measurement with respect to the target.

36. The method of claim 35 wherein the target comprises a natural feature in an environment.

37. A method comprising:
computing an estimate of a pose of a target element relative to a sensor element based on an estimate of a pose of a tracked object relative to an environment having affixed thereto either the sensor element or the target element,
the computing of the estimate of the pose of the target element relative to the sensor element further based on an estimate of a pose of the affixed element relative to the tracked object and the other element relative to the environment;
computing an estimate of a measurement of the target made by the sensor based on the estimate of the pose of the target relative to the sensor;

making an actual measurement of the target by using the sensor;

computing a deviation between the actual measurement and the estimated measurement; and generating a new estimate of the pose of the tracked object based on the deviation.

38. The method of claim 37, further comprising computing a first observation matrix that characterizes a linearized model of a function relating the measurement made by the sensor to the pose of the target relative to the sensor.

39. The method of claim 38, further comprising computing a second observation matrix that characterizes a linearized model of a function relating the pose of the target relative to the sensor to the estimate of the pose of the tracked object relative to the environment.

40. The method of claim 39, further comprising computing an observation matrix that characterizes a linearized model of a function relating the measurement made by the sensor to the pose of the tracked object relative to the environment by combining the first observation matrix and the second observation matrix.

41. A method comprising:

estimating a first value associated with a pose of a first sensing element relative to a second sensing element, the first sensing element fixed to an environment and the second sensing element fixed to an object being tracked, one of the first and second sensing elements being a sensor and the other being a target;

estimating a second value associated with a pose of the second sensing element relative to the first sensing element;

determining which of the first and second sensing elements is the sensor; and generating an innovation of a measurement of the target made by the sensor based on the first value when the second sensing element is the sensor.

42. The method of claim 41, further comprising generating the innovation based on the second value when the first sensing element is the sensor.

43. The method of claim 41 wherein estimating the first value and estimating the second value are performed by a process ignorant of which of the first and second sensing elements is a sensor.

44. A method comprising estimating a calibration parameter of a sensing element that is either a sensor or a target, the sensing element being fixed either to an environment or to an object being tracked;

determining whether the sensing element is the sensor or the target; and assigning the calibration parameter as a sensor calibration parameter when the sensing element is a sensor, and generating an innovation of a measurement of a target made by the sensing element based in part on the sensor calibration parameter.

45. The method of claim 44, further comprising assigning the calibration parameter as a target calibration parameter when the sensing element is a target, and generating an innovation of a measurement of the sensing element made by a sensor based in part on the target calibration parameter.

46. The method of claim 44 wherein estimating the calibration parameter is performed by a process ignorant of whether the sensing element is a sensor or a target.

47. A method of using multiple sensors in a tracking system comprising:

providing an estimation module;

coupling one or more sensor modules to the estimation module, each associated with a different set of one or more sensors;

configuring the tracking system, including providing configuration information from each of the sensor modules to the estimation module regarding the characteristics of the sensors associated with the sensor module, and configuring the estimation module using the provided configuration information;

maintaining estimates of tracking parameters in the estimation module, including repeatedly passing data based on the estimates of the tracking parameters from the estimation module to one or more of the sensor modules, receiving from said one or more sensor modules at the estimation module data based on measurements obtained from the associated sensors, and the data passed to the sensor modules, and combining the data received from said one or more sensor modules and the estimates of the tracking parameters in the estimation module to update the tracking parameters.

48. The method of claim 47 wherein the data passed from the estimation module to one or more of the sensor modules includes an estimate of the pose of a target relative to a sensor that was calculated by the estimation module using an estimate of the pose of a tracked object relative to a frame of reference fixed to an environment.

49. The method of claim 48 wherein the data passed from the estimation module to one or more of the sensor modules does not include the estimate of the pose of the tracked object relative to the frame of reference fixed to the environment.

50. The method of claim 47 wherein providing the estimation module includes providing a module that is configurable to use different sets of sensor modules coupled to it.

51. The method of claim 47 wherein maintaining estimates of the tracking parameters in the estimation module includes using a stochastic model in the estimation module.

52. The method of claim 51 wherein using a stochastic model includes implementing some or all of a Kalman filter in the estimation module.

53. The method of claim 52 wherein implementing some or all of the Kalman filter includes updating error estimates using linearized models of the sensor system.

54. The method of claim 52 wherein implementing some or all of the Kalman filter includes implementing a distributed Kalman filter, wherein each of a plurality of components of the distributed Kalman filter is associated with a different subset of the sensor modules.

55. The method of claim 54 wherein one of the components of the distributed Kalman filter is associated with a subset of sensor modules consisting of sensor modules that are affixed to a tracked object.

56. The method of claim 54 wherein one of the components of the distributed Kalman filter is associated with a subset of sensor modules consisting of sensor modules which are affixed to an environment.

57. The method of claim 54 wherein one of the components of the distributed Kalman filter is not associated with any sensor modules.

58. The method of claim 54 wherein implementing the distributed Kalman filter includes implementing a Federated Kalman Filter.

59. The method of claim 47 wherein providing configuration information from the sensor modules includes providing information characterizing a type of a sensor associated with a sensor module.

60. The method of claim 47 wherein providing configuration information from the sensor modules includes providing information characterizing a position or an orientation of a sensor associated with a sensor module.

61. The method of claim 47 wherein providing configuration information from the sensor modules includes providing information characterizing one or more calibration parameters of a sensor associated with a sensor module.

62. A machine-accessible medium, which when accessed results in a tracking or navigation system that tracks or navigates, respectively, an object, performing operations comprising:
  enumerating a set of sensing elements available to the tracking or navigation system, the sensing elements available to the tracking or navigation system including at least one of an inside-out sensor and an outside-in sensor, the inside-out sensor being fixed to the object and makes measurements with respect to a target fixed to an environment, the outside-in sensor being fixed to the environment and makes measurements with respect to a target fixed to the object;
  configuring an estimation module of the tracking or navigation system based on an enumeration of the set of sensing elements available to the tracking or navigation system so that the estimation module can process measurement information from either inside-out sensors, outside-in sensors, or a combination of inside-out and outside-in sensors depending on the sensors available; and
  repeatedly updating an estimated pose of an object based on measurements from the set of sensing elements available to the tracking or navigation system.

63. The machine-accessible medium of claim 62 in which the sensing elements available to the tracking or navigation system include range sensors, and configuring the estimation module includes configuring the estimation module so that the estimation module can process measurement information from either inside-out sensors, outside-in sensors, range sensors, or any combination of the above sensors.

64. The machine-accessible medium of claim 62 in which the sensing elements available to the tracking or navigation system include inertial sensors, and configuring the estimation module includes configuring the estimation module so that the estimation module can process measurement information from either inside-out sensors, outside-in sensors, inertial sensors, or any combination of the above sensors.

65. The machine-accessible medium of claim 62 in which the sensing elements available to the tracking or navigation system include dead reckoning sensors, and configuring the estimation module includes configuring the estimation module so that the estimation module can process measurement information from either inside-out sensors, outside-in sensors, dead reckoning sensors, or any combination of the above sensors.

66. A method comprising:
  receiving sensor configuration information indicating a set of sensing elements available to a tracking or navigation system;
  configuring a data processing module of the tracking or navigation system based on the sensor configuration information to selectively perform one of
    (a) receiving data from at least one inside-out bearing sensor, and updating an estimated pose of an object based on data received from the inside-out bearing sensor,
    (b) receiving data from at least one outside-in bearing sensor, and updating an estimated pose of an object based on data received from the outside-in bearing sensor, and
    (c) receiving data from at least one inside-out bearing sensor and at least one outside-in bearing sensor, and updating an estimated pose of an object based on data received from the outside-in bearing sensor and the inside-out bearing sensor.

67. The method of claim 66 further comprising configuring the data processing module to selectively perform one of
  (d) receiving data from at least one range sensor, and updating an estimated pose of an object based on data received from the range sensor,
  (e) receiving data from at least one range sensor and at least one inside-out bearing sensor, and updating an estimated pose of an object based on data received from the range sensor and the inside-out bearing sensor,
  (f) receiving data from at least one range sensor and at least one outside-in bearing sensor, and updating an estimated pose of an object based on data received from the range sensor and the outside-in bearing sensor, and
  (g) receiving data from at least one range sensor, at least one outside-in bearing sensor, and at least one inside-out bearing sensor, and updating an estimated pose of an object based on data received from the range sensor, the inside-out bearing sensor, and the outside-in bearing sensor.

68. An apparatus comprising:
  an estimation module to estimate a pose of an object based on measurement data from sensing elements, the estimation module configured to enable selective performance of
    (a) receiving data from at least one inside-out bearing sensor, and updating an estimated pose of an object based on the data received from the inside-out bearing sensor,
    (b) receiving data from at least one outside-in bearing sensor, and updating an estimated pose of an object based on the data received from the outside-in bearing sensor, and
    (c) receiving data from at least one inside-out bearing sensor and at least one outside-in bearing sensor, and updating an estimated pose of an object based on the data received from the outside-in bearing sensor and the inside-out bearing sensor.

69. An apparatus comprising:
  an estimation module to estimate a pose of an object based on measurement data from sensing elements, the estimation module configured to enable selective performance of one of:
    (a) updating an estimate of the position or orientation of the object relative to an environment,
    (b) updating an estimate of the position or orientation, relative to the object, of at least one sensing element fixed to the object, and
    (c) updating an estimate of the position or orientation, relative to the environment, of at least one sensing element fixed in the environment.

* * * * *